United States Patent
Cheek et al.

(10) Patent No.: US 6,883,846 B2
(45) Date of Patent: Apr. 26, 2005

(54) GOLF CAR TOP

(75) Inventors: Joel A. Cheek, Newman, GA (US); Louis R. Doucette, Newman, GA (US); Kendall A. Fisher, Newman, GA (US); Keisuke Yoshida, Newman, GA (US)

(73) Assignee: YamahaMotor Manufacturing Corporation of America, Newman, GA (US)

( * ) Notice: Subject to any disclaimer, the term of this patent is extended or adjusted under 35 U.S.C. 154(b) by 0 days.

(21) Appl. No.: 10/386,383

(22) Filed: Mar. 10, 2003

(65) Prior Publication Data

US 2003/0209918 A1 Nov. 13, 2003

Related U.S. Application Data

(60) Provisional application No. 60/363,140, filed on Mar. 8, 2002.

(51) Int. Cl.[7] .............................................. B62D 25/07
(52) U.S. Cl. ...................... 296/1.02; 296/102; 296/210; 296/213; 280/DIG. 5
(58) Field of Search ................................ 296/1.02, 102, 296/104, 105, 210, 213, 225; 280/DIG. 5; D12/401

(56) References Cited

U.S. PATENT DOCUMENTS

| | | |
|---|---|---|
| 2,888,021 A | 5/1959 | Adams |
| 3,176,699 A | 4/1965 | Rollins |
| D236,098 S | 7/1975 | Bedel |
| 4,037,614 A | 7/1977 | Hines et al. |
| 4,102,537 A | 7/1978 | Takahashi et al. |
| 4,332,415 A | 6/1982 | Williams |
| 4,650,238 A | 3/1987 | Healey |
| 4,772,064 A | 9/1988 | Moore |
| 4,846,524 A | 7/1989 | Gerber |
| 5,022,420 A | 6/1991 | Brim |
| 5,031,713 A | 7/1991 | Criscuolo |
| 5,094,500 A | 3/1992 | Maypole et al. |
| 5,190,340 A | 3/1993 | Nuscher |
| D394,637 S | 5/1998 | Camiano |
| 5,842,732 A | * 12/1998 | Daggett, deceased et al. ........................ 296/102 |
| 5,975,614 A | 11/1999 | Mc Grue |
| 6,059,351 A | 5/2000 | Ehnes |
| D430,579 S | 9/2000 | Westendorf et al. |
| D431,018 S | 9/2000 | Maypole |
| 6,149,228 A | 11/2000 | O'Neill et al. |
| 6,186,584 B1 | 2/2001 | Samuelson et al. |
| 6,220,657 B1 | 4/2001 | Rea |
| 6,276,745 B1 | 8/2001 | Wilson |
| 6,464,291 B2 | 10/2002 | Hynds et al. |
| 6,557,922 B1 * | 5/2003 | Hommel ............... 296/107.17 |
| 6,586,668 B2 * | 7/2003 | Shugar et al. ............. 136/244 |
| 2001/0005091 A1 | 6/2001 | Mizuta et al. |
| 2001/0007396 A1 | 7/2001 | Mizuta |
| 2002/0014790 A1 | 2/2002 | Hynds et al. |

* cited by examiner

Primary Examiner—Jason Morrow
(74) Attorney, Agent, or Firm—Knobbe Martens Olson & Bear LLP

(57) ABSTRACT

A top for a small vehicle, such as a golf car, has a roof member and a set of struts that are pivotally attached to the roof member. The struts can be folded for shipping and storage. The top also has features that accommodate stacking of tops for shipping and storage. In addition, a handle is located inboard of an outer periphery of the roof member so that a hand grasping the handle is not exposed outside of the periphery. Furthermore, in one arrangement, the handle is mounted at a location that keeps an occupant's arm within the periphery if the handle is properly grasped. An improved drainage system also is provided to minimize splashing toward occupants.

65 Claims, 22 Drawing Sheets

GOLF CAR TOP

RELATED APPLICATIONS

This application claims the priority benefit under 35 U.S.C. § 119(e) of U.S. Provisional Patent Application No. 60/363,140, filed on Mar. 8, 2002, the which is hereby incorporated by reference herein.

BACKGROUND OF THE INVENTION

1. Field of the Invention

The present invention generally relates to small motorized vehicles, such as golf cars and other forms of utility vehicles. More particularly, the present invention relates to improvements to tops for such motorized vehicles.

2. Description of the Related Art

Small motorized vehicles are used in various applications. One such motorized vehicle is a golf car. Various tops have been designed and proposed for use on golf cars. These tops have been called by various names through the years, including roofs, canopies, umbrellas and tops. Generally, these tops are designed to shield occupants of the vehicles from sun, rain and other forms of inclement weather.

A typical top comprises an upper, generally horizontally extending sheetlike member that is supported by four generally vertically extending standards or struts. The front of the top typically is supported by two legs of a front standard, which can be formed in a U-shape, while the rear of the top can be supported by two independent standards. See, for instance, U.S. Pat. No. 5,031,713, issued on Jul. 16, 1991, to James M. Criscuolo. The standards attach to the frame of the vehicle in some manner such that the vehicle frame can support the loading of the top.

In some instances, to assemble a top to a small motorized vehicle, such as a golf car, the standards first must be assembled to the lower surface of the top. After the standards are connected and secured in position, the top is raised over the vehicle. With the top supported in approximately the desired positioning, the standards are secured to the vehicle frame using bolts or other forms of fastening members. In other instances, the standards are attached to the golf car and then the top is attached to the standards.

Thus, the top, the frame (e.g., the standards) and the fastening members are not connected together during shipping. Instead, only during final assembly by a dealer, for instance, are the components joined together and mounted to the vehicle. This results in excessive installation time and expense on behalf of the dealer or other installation person. In addition, fastening members can become lost or easily misplaced between the factory and the on-site installation.

In some arrangements, such as those shown in U.S. Pat. No. D431,018, issued on Sep. 19, 2000, to William H. Maypole, and U.S. Pat. No. 5,094,500, issued on Mar. 10, 1992, to William H. Maypole, Charles R. Sagraves, Samuel C. Crosby, William J. Sanders, and William F. Price, the tops have handgrips integrated into the outer periphery of the top. These handgrips commonly are used by occupants when entering or leaving the vehicle, even though such a use is discouraged by vehicle manufacturers. In addition, these handgrips may be used during operation of the vehicle over rougher terrain.

Additionally, as disclosed in U.S. Pat. No. 6,186,584, some golf car tops are provided with rain gutter arrangements. The rain gutter arrangement of the '584 patent features a first rain gutter, sloped back-to-front, and a second rain gutter, sloped front-to-back. The first rain gutter extends around the outer perimeter of the sides and the front and has a drain hole provided in the corners between the front and the sides. The second rain gutter is formed in a rectangular shape and is located inboard of the first rain gutter. The second rain gutter is provided with drains that extend to the corners of the top defined between the sides and the back of the top. In fact, the patent disclosed that the sidewalls of the gutter separate to form the drain at each rear corner.

As would be expected, these gutters are provided to drain rainwater from the top. Unfortunately, in the case of the forward drain holes of the '584 patent, the water passing from the top is likely to be blown toward the operator of the vehicle. In addition, from an aesthetic standpoint, the appearance of the top is diminished by the unsightly lines that define the gutters and drains. For instance, these lines can be viewed from the back of the vehicle '584 patent. Thus, the gutters stand out and attract attention.

SUMMARY OF THE INVENTION

In view of the above-described problems, an improved top for small motorized vehicles is desired.

In one feature of the present top design, the top preferably is easily installed after shipping. For instance, the struts can be attached to the top prior to shipping. In addition, to facilitate bulk shipping, the struts desirably fold down and the tops are provided with feet to allow stacking of multiple units to decrease the space occupied by a number of tops during bulk shipping.

In another feature of the present top design, the top can be provided with a handle that is disposed inboard of the outer edge of the top. Preferably, the handle can be positioned under the top in a location and at an angle that will be slightly uncomfortable to grasp. When grasped by an outboard hand of an average adult male, the handle desirably should be disposed to result in the outboard elbow of the individual being positioned inboard of the outer perimeter of the top. In some arrangements, the handle will be disposed for grasping by the inboard hand.

In a further feature of the present top design, a drainage system is provided to allow the amount of standing water to be minimized. The drainage system preferably is invisible when the top is viewed from the rear. In addition, at least a portion of the drainage system cooperates with an exterior surface of the struts such that water flowing from the top will pass along the outer surface of the struts by attractive forces between the water and the strut surface.

It should be recognized to these and other features are capable of implementation in a single top design. In addition, depending upon the desires of the manufacturer, one or more than one of these features can be implemented together; however, not all of these features need to be implemented in any single design.

Accordingly, one aspect of the present invention involves a small vehicle comprising a frame assembly with a front wheel and a rear wheel supporting the frame assembly. A top assembly is mounted to the frame assembly with the top assembly comprising a roof member, a front strut and a rear strut. The roof member comprises an outer perimeter and a handle. The handle is connected to the roof member and is disposed inside of the outer perimeter such that a hand grasping the handle would be completely positioned within the outer perimeter.

Another aspect of the present invention involves a method of manufacturing and shipping an assembled top for a small vehicle. The method comprises forming a roof member, pivotally attaching supports to the roof member and securing the supports in a lowered position to the roof member and shipping the assembled top.

A further aspect of the present invention involves a top assembly for a small vehicle. The top assembly comprises a roof member, a front strut and a rear strut with the front strut and the rear strut being pivotally connected to the roof member. The roof member, the front strut, and the rear strut each comprise a securing configuration adapted to secure the front strut and the rear strut in an extended position.

BRIEF DESCRIPTION OF THE DRAWINGS

These and other features, aspects and advantages of the present invention will now be described with reference to the drawings of a preferred embodiment, which embodiment is intended to illustrate and not to limit the invention. The drawings comprise 22 figures.

DETAILED DESCRIPTION OF THE PREFERRED EMBODIMENT

Figure 1:
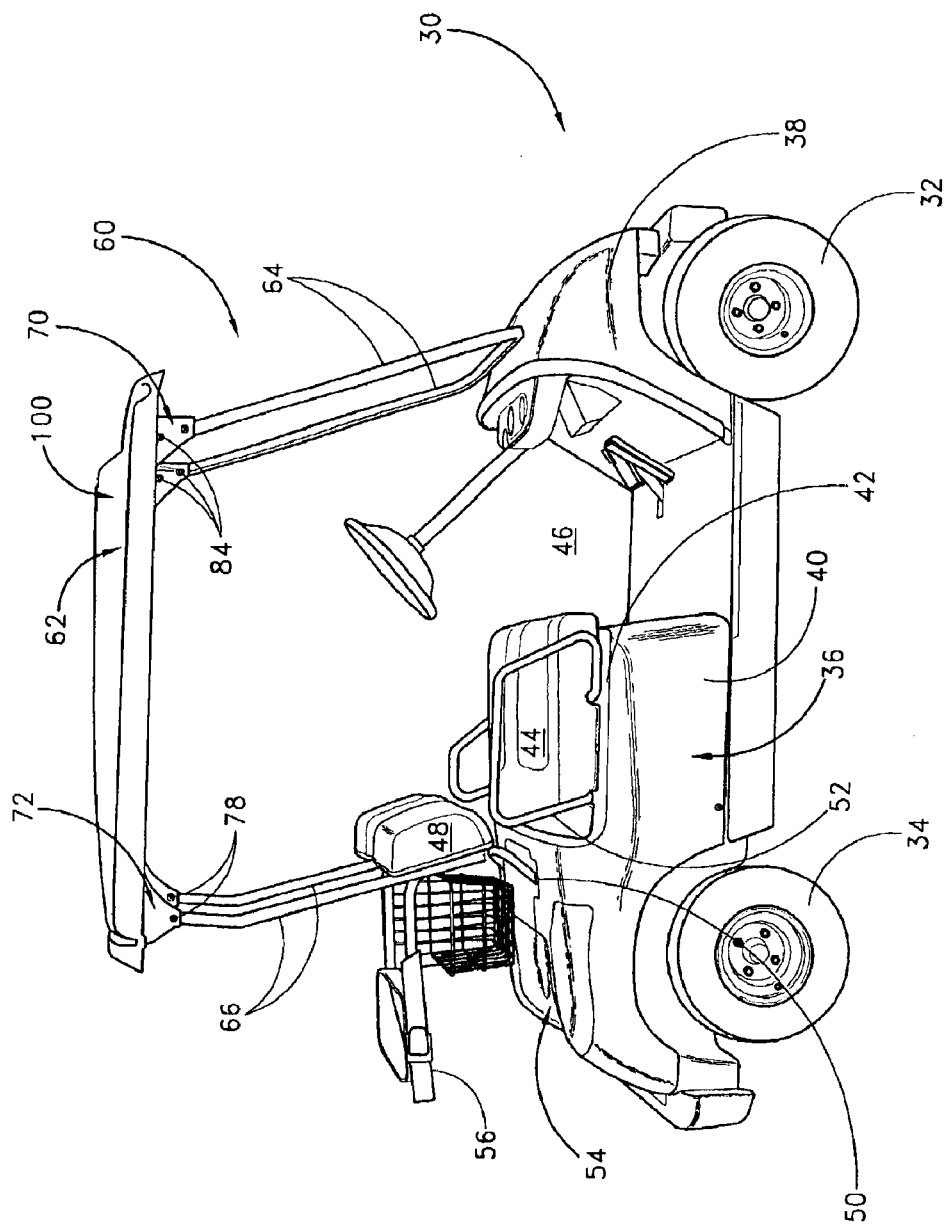
FIG. 1 is a side elevation view of a golf car having a top that is arranged and configured in accordance with certain features, aspects and advantages of the present invention.

With reference now to FIG. 1, a golf car with a top that is arranged and configured in accordance with certain features, aspects and advantages of the present invention is illustrated. The golf car is illustrated because the top has particular utility with such vehicles. The top also can be used with all terrain vehicles, utility vehicles and the like. Accordingly, the scope of the present invention is not intended to be limited to golf cars unless explicitly recited by the claims that follow this detailed description.

The golf car, indicated generally by the reference numeral 30, generally comprises a frame assembly (not shown) that is supported by a pair of front wheels 32 and a pair of rear wheels 34. In some arrangements, a single front wheel 32 may be provided. The front wheels 32 support the frame assembly in a manner that allows steering movement of the front wheels 32 relative to the frame assembly while the rear wheels 34 are mounted in a generally fixed direction.

A body 36 that comprises a number of body panels is mounted to the frame assembly. In particular, a decorative molded cowl 38 covers a forward portion of the frame assembly and any front suspension components. A molded side panel 40 extends over a medial-to-rear portion of the frame assembly and features an upper surface 42 that supports a seat cushion 44. In most arrangements, the side panel 40 is pivotally attached to the chassis to provide access to a motor or engine that is contained within an engine compartment defined beneath the side panel 40. Preferably, the golf car 30 is open on both sides, such that a pass-through operator compartment is defined, as generally indicated by reference numeral 46. The pass-through facilitates entry and exit by occupants.

In addition to the seat cushion 44, a seat back member 48 is provided and it is preferably supported by a seat back support member 50, which may be a formed steel or aluminum tube, the legs of which project upward from an attachment point located on a portion of the frame assembly. Bent tubular side rails 52 are provided on each side of the illustrated seat cushion 44.

A rear portion 54 of the body is not covered as it would be on a conventional automobile but instead preferably comprises a horizontal deck located behind the seat back member 48 on which golf bags may be carried in an upright position. Bags are held in this upright position by a bag support 56 which is fastened to the bent extension of the seat back support member 50.

The golf car vehicle described thus far may be considered somewhat conventional. Accordingly, where details relating to the construction of the golf car have been omitted, such details are believed to be understood by those of ordinary skill in the art and any suitable construction or implementation can be used.

With continued reference to FIG. 1, the top assembly 60 includes a roof member 62 which is supported by a pair of front roof support posts or struts 64 and a pair of rear roof support posts or struts 66. The struts 64, 66 preferably comprise extruded metal tubes having a generally rectangular cross-section. Other configurations can be used. The struts 64, 66 advantageously are pivotally attached to the roof member 62. In particular, the struts 64, 66 desirably are pivotally attached to a lower surface of the roof member 62 in manners that will be described.

The front struts 64 are maintained in generally parallel, spaced-apart relation on opposing sides of the vehicle body 36. In the illustrated arrangement, the front struts 64 are formed of a single U-shaped component. The upper ends of the legs that define U-shape are pivotally connected to the roof member 62 while the bight of the U-shape is secured to the vehicle 30 in any suitable manner. In the illustrated arrangement, the bight preferably comprises two apertures that receive mounting posts that are connected to the frame assembly.

Figure 4:
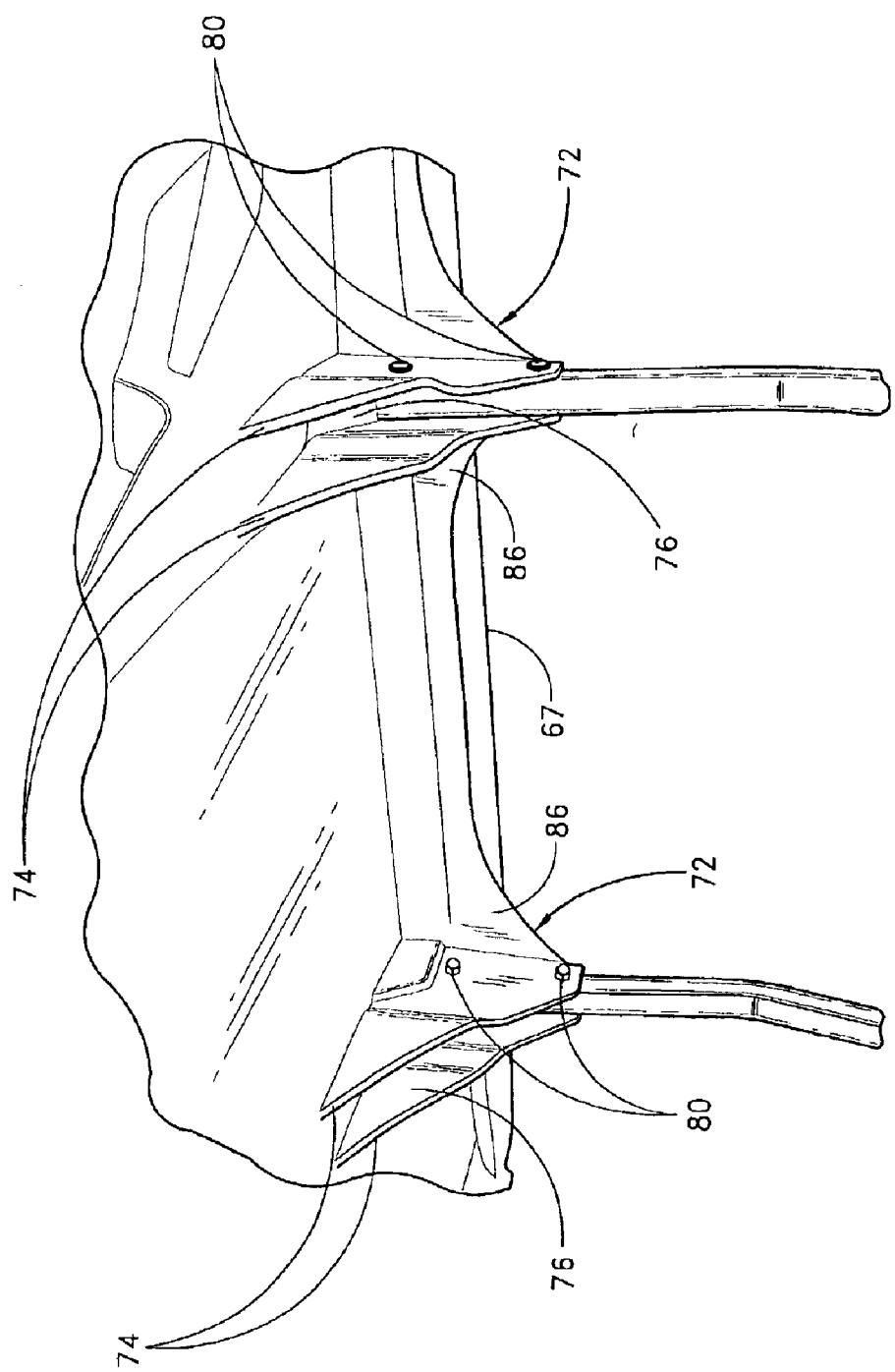
FIG. 4 is a perspective view of a rear portion of the lower surface of the roof member and the top showing mounting feet and a pair of rear struts, which form a supporting frame assembly of the top.

The rear struts 66 also are desirably maintained in generally parallel, spaced-apart relation on opposing sides of the vehicle body. In the illustrated arrangement, the rear struts 66 are independent of each other. In addition, as illustrated in FIGS. 1 and 4, the rear struts 66 desirably comprise a bend that will allow the rear struts to extend alongside the seat back support members 50. The rear struts in the illustrated arrangement are secured to the seat back support members 50, which in turn are securely mounted to the frame assembly in any suitable manner.

The roof member 62 preferably is formed of a fairly rigid yet light weight material. In one arrangement, the roof member 62 is formed of a resin-based material. In some arrangements, the roof member 62 is thermoformed. In other arrangements, the roof member 62 is formed by gas-assist injection molding processes or structural foam. The roof member 62 generally comprises an outer periphery 67, which is generally rectangular in the illustrated arrangement. The outer periphery 67 preferably is defined by the sides of the roof member 62 (i.e., the external boundary of the roof member 62) and can bow inward or outward at various locations depending upon the design of the roof member. Thus, other shapes also can be designed for the outer periphery 67. In the illustrated arrangement, the outer periphery 67 complements a desire for adequate coverage of any operators and occupants. In some arrangements, which are not shown, the outer periphery also complements a desire for adequate coverage of items stored behind the seats (e.g., golf bags).

Figure 2:
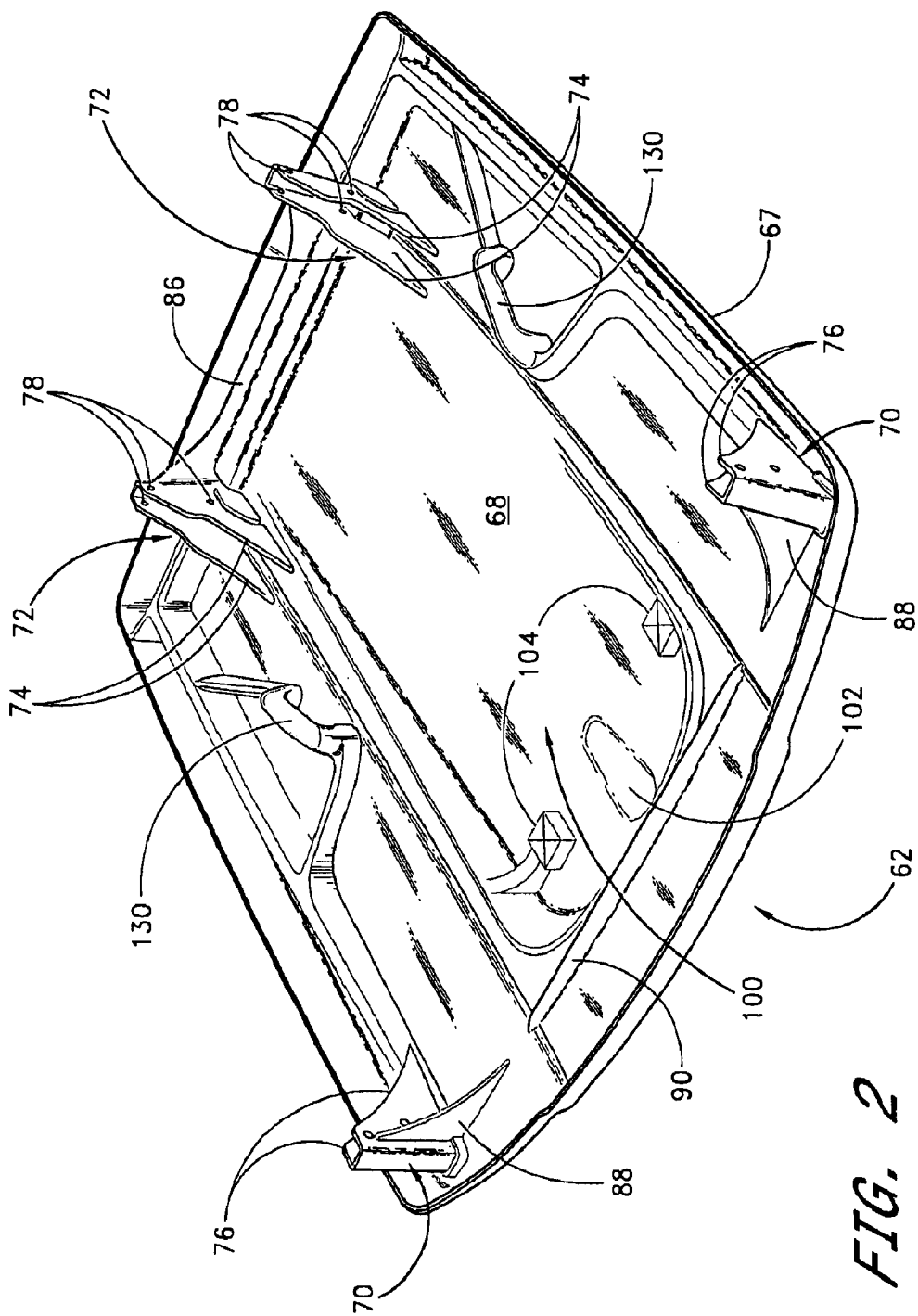
FIG. 2 is a perspective view of a lower surface of a roof member of the top viewed from the front right side.
Figure 3:
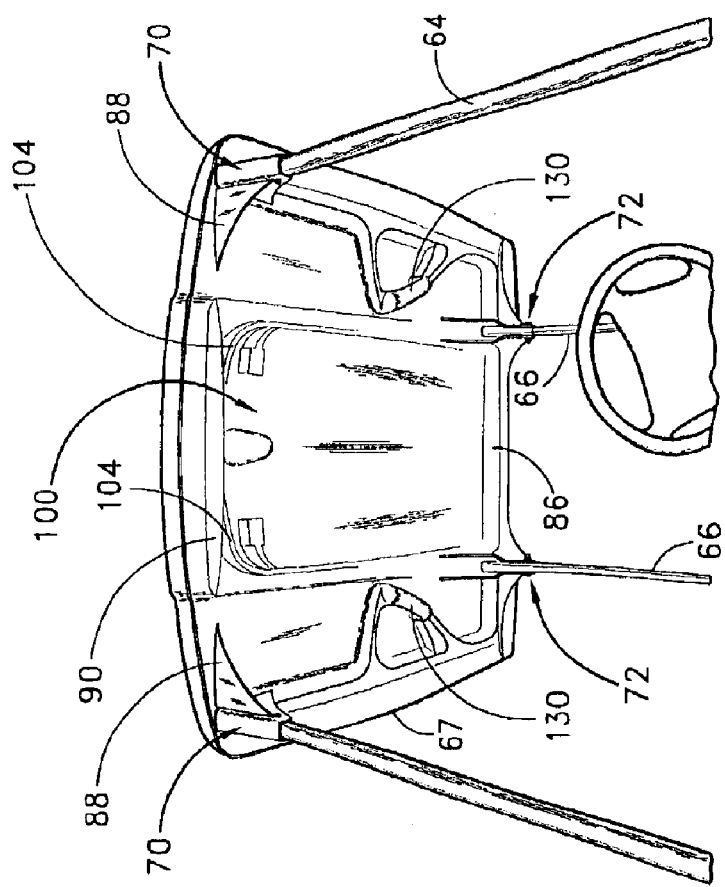
FIG. 3 is a perspective front view of the lower surface of the roof member with a supporting frame assembly in position for installation to a vehicle.

With reference to FIG. 2, a lower surface 68 of the roof member 62 is illustrated. A pair of front feet 70 and a pair of rear feet 72 are attached to the lower surface 68. In the illustrated arrangement, the feet 70, 72 are integrally formed with the roof member 62 in manners that will be described. In some arrangements, the feet 70, 72 can be separately formed and attached in any suitable manner, including, but not limited to, welding, adhering, cohering, mechanical fasteners and interlocking physical constructions. As illustrated in FIG. 1, the feet 70, 72 define attachment locations for the front struts 64 and the rear struts 66, respectively.

With reference again to FIG. 2, the feet 70, 72 desirably are formed with longitudinally extending slot-like openings. In other words, each of the feet 70, 72 comprises a pair of longitudinally extending walls that, together with the lower surface 68 of the roof member 62, define a channel. The slot-like openings preferably are designed to allow a friction fit with the struts when extended in the mounting position. In one arrangement, the slot-like openings allow some degree of side-to-side movement of the struts when the struts are in a folded-down position.

Figure 15:
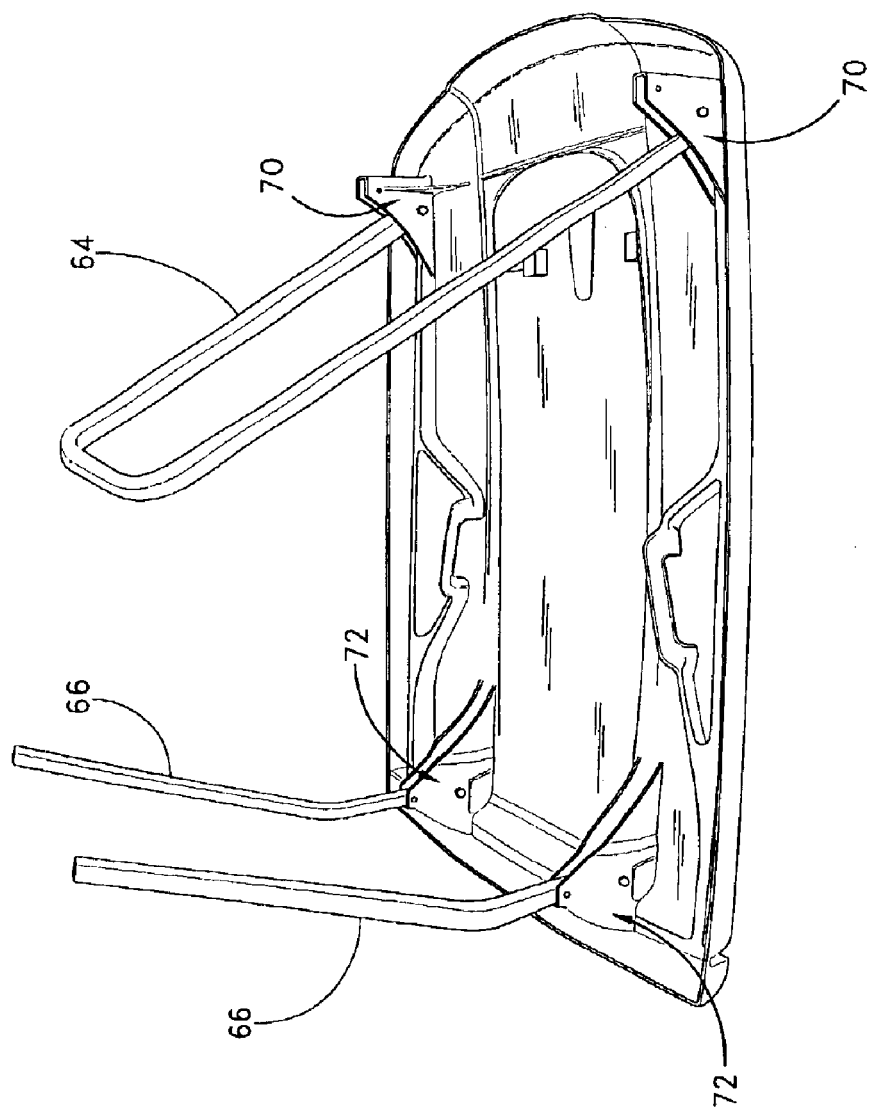
FIG. 15 is a perspective view of the top with the front struts being folded or extended.
Figure 16:
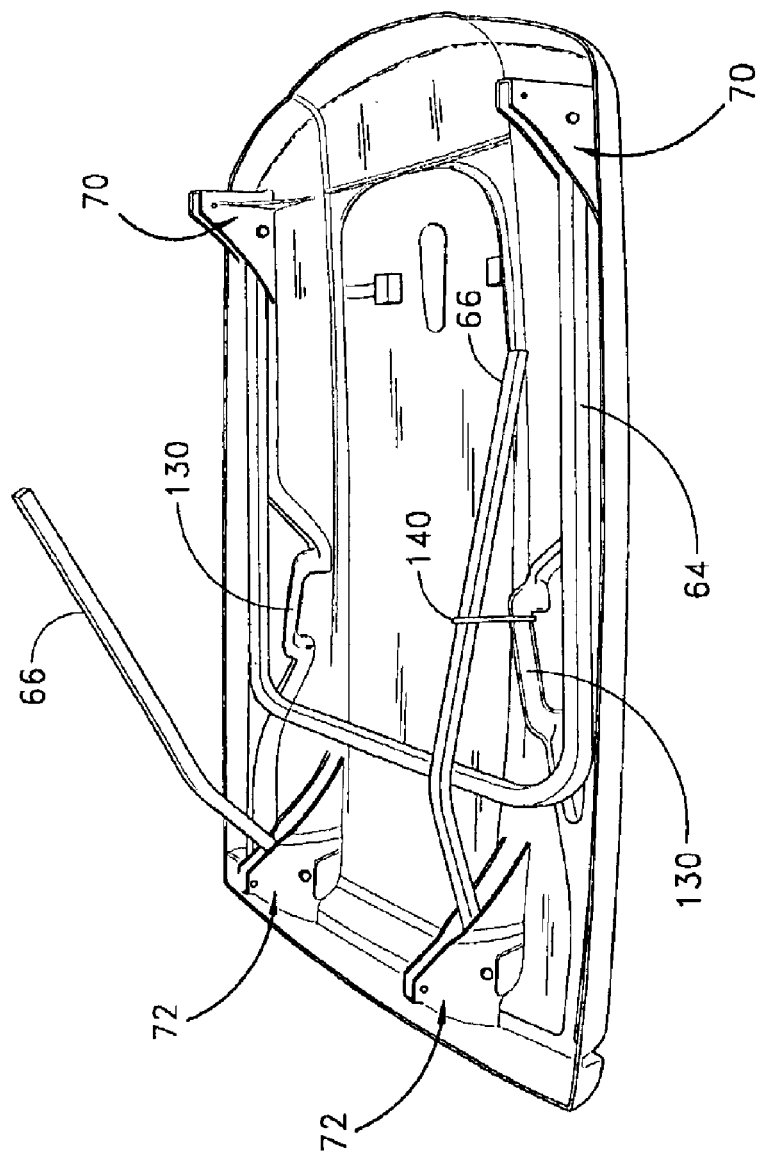
FIG. 16 is a perspective view of the top with the front struts folded, one of the rear struts folded and secured in the folded position and the other of the rear struts being folded or extended.
Figure 18:
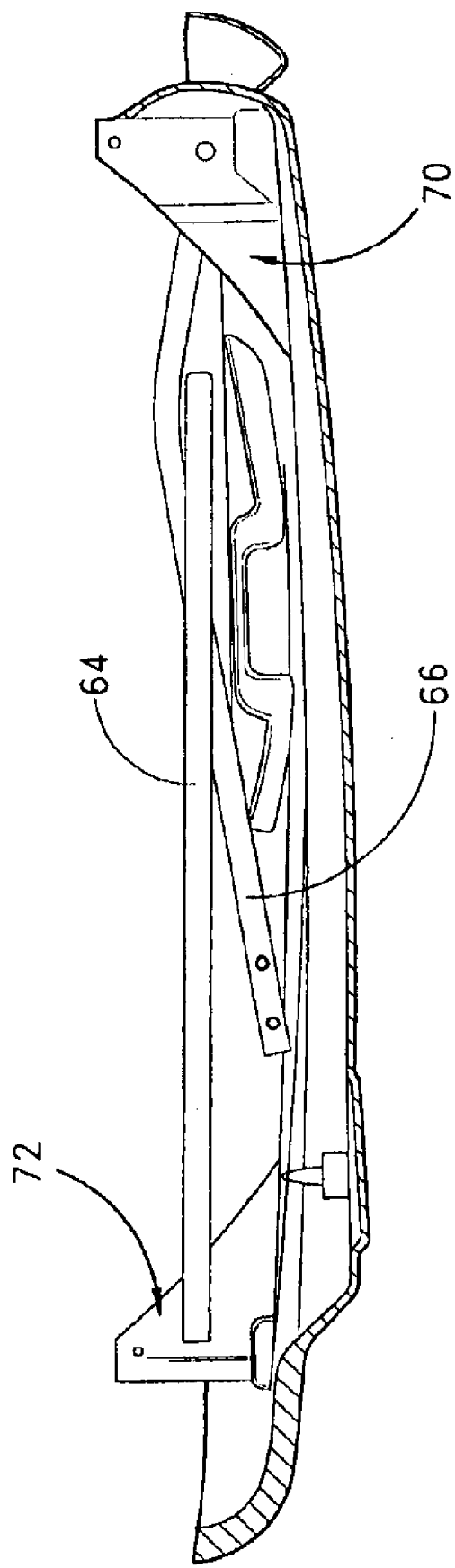
FIG. 18 is a schematic side view of the top illustrating that a bottom end of each of the rear struts preferably does not contact the lower surface of the roof member when secured for shipping and that the rear struts preferably secure the front strut in a folded position.

With reference now to FIG. 4, the walls will be better described with respect to the rear feet 72. This description equally applies to the front feet 70 of the illustrated arrangement. The walls 74 extend in a generally longitudinal direction. Preferably, the walls 74 extend generally parallel to each other. Thus, the walls 74 define a longitudinally disposed channel 76. As explained above, this channel 76 desirably is sized and configured to allow the rear struts 66 to move between an extended position (as shown in FIG. 15) and a folded position (as shown in FIG. 18). In one particularly preferred arrangement, the walls 74 are spaced apart a distance that results in a friction fit with the respective rear strut 66 when the strut is disposed in the extended position. Such a construction reduces noticeable rattling during vehicle movement and results in a more secure mounting of the roof member 62 to the balance of the golf car 30. In this arrangement, the forward portion of the channel 76 need not be sized for a friction fit and the rear struts 66 can move more freely when not in the extended position. With respect to the front feet 70, the rear portion of the channel need not be sized for a friction fit and the front struts 64 can move more freely when not in the extended position.

The walls 74 preferably taper in height such that rearmost portion of the walls 74 is taller than the forward most portion of the walls 74. This tapering results in a gusset structure that strengthens the connection between the feet 70, 72 and the balance of the top 68. In particular, this structure provides added strength in a front to rear direction. As indicated above, the front feet 70 also can be formed by similarly constructed walls 76, only those walls 76 would preferably taper from front to rear rather than rear to front. Tapering the walls 76 reduces the extent to which the walls 76 extend into the interior of the golf car 30 and reduces the amount of material used to form the roof member 62, which lowers the overall weight of the roof member 62. Additionally, tapering the walls 76 reduces the likelihood of contact between roof members 62 when stacked for shipping, as will be described.

With continued reference to FIG. 4, each wall 74 of each rear foot 72 preferably contains at least two holes 78 that define at least two axes. The holes 78 align with holes formed in the rear struts 66 such that fastening members 80, such as bolts, pins, rods or the like, for example but without limitation, can secure the strut 66 in an extended position. In some arrangements, a third set of holes can be provided through the walls 74 to secure the strut in a lowered (i.e., folded) position, as will be described below. Notably, the walls 76 that define the front feet 70 also comprise similarly arranged holes 82 that accept similar fastener members 84.

With reference still to FIGS. 2 and 4, the feet 70, 72 preferably are supported in a transverse direction by a further tapering wall. As with the above description, the wall will first be described with reference to the rear feet 72. As illustrated in FIG. 4, the wall 86 extends inboard of the respective feet 72. The wall 86 desirably tapers in the inboard direction. Such a taper, again, saves material and weight. In addition, the provision of the wall reinforces the feet 72 in a transverse direction.

In one particularly preferred construction, however, the wall 86 does not taper completely; instead, the wall 86 tapers to a desired height and extends the width between the inboard walls 74 of the rear feet 72. This full extension of the wall 86 defines a location that can accept an information holder (not shown). Thus, with the illustrated arrangement, a rear information holder (not shown) can be installed on the wall 86. In some arrangements, holes may be provided for mounting the information holder while, in other arrangements, the information holder can be magnetically mounted or adhered into position. As is known, an information holder can hold advertising, a score card, warning labels or the like.

With reference now again to FIG. 2, each of the front feet 70 also preferably comprises a transversely extending wall 88. The wall 88 can extend completely between the feet 70 or, as in the illustrated arrangement, can extend only a portion of the span between the feet 70. In the illustrated arrangement, the walls 88 taper to nothing just inboard of the respective feet. Again, this reduces the amount of material used to form the top and reduces the overall weight of the roof member 62.

In arrangements, such as the illustrated arrangement, in which the walls 88 do not meet, an information holder flange 90 can be disposed in a central location between the front feet 70 and inset from the forward edge of the roof member 62. With the provision of the information holder flange 90 and the adjoining rear walls 86, the illustrated roof member 62 provides mounting locations for information holders wherein the information holders are separated from each other in a longitudinal direction of the roof member 62. Furthermore, the mounting locations in the illustrated arrangement advantageously have been designed to accommodate two information holders each. Thus, four information holders can easily be installed in arrangements featuring both front and rear mounting locations. In arrangements in which the front walls 88 adjoin, the information holder flange 90 can be eliminated as the adjoining front wall 88 can be used as a mounting location for the front information holders.

Figure 5:
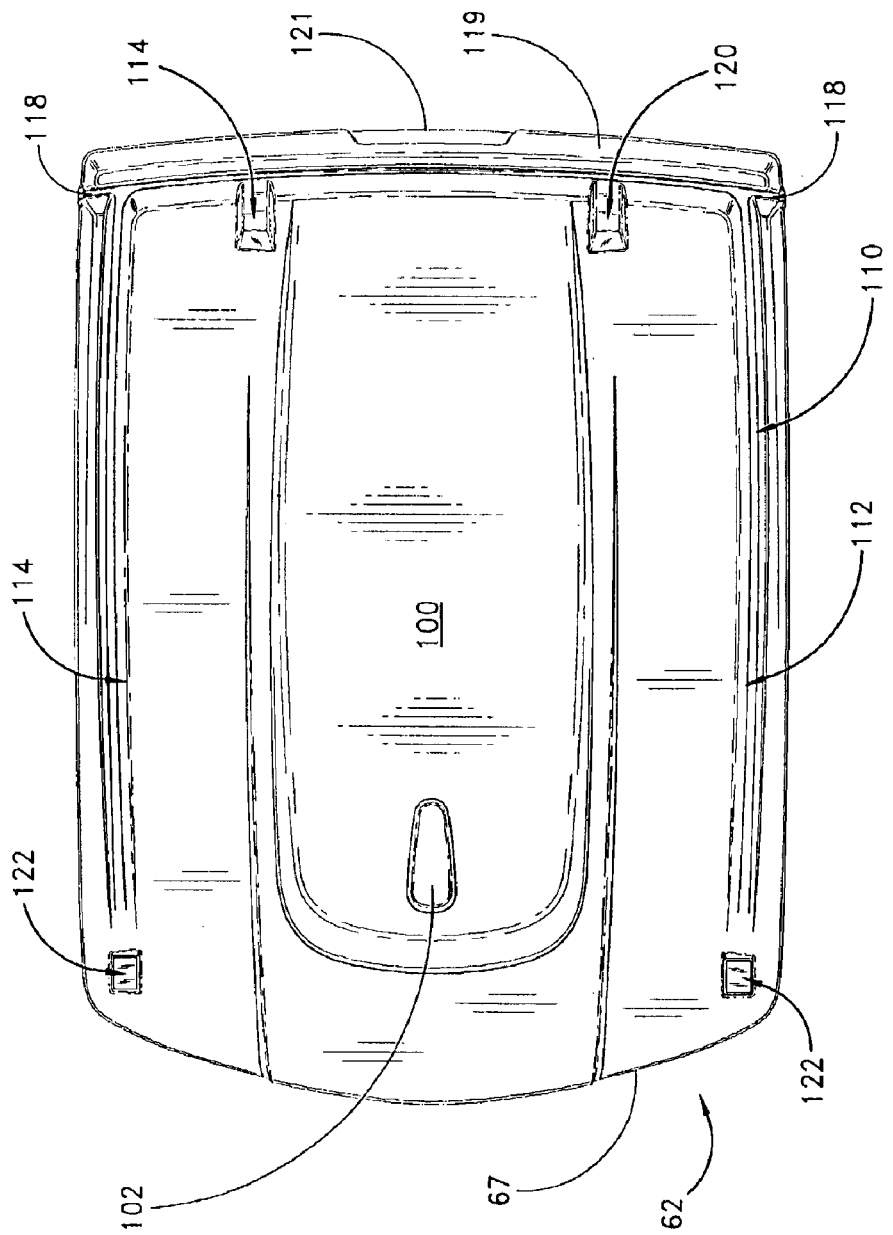
FIG. 5 is a top plan view of the roof member.

With reference now to FIG. 5, additional features of the illustrated roof member 62 will be described. As illustrated, the roof member 62 desirably comprises a centrally located upward protrusion 100. The protrusion 100 preferably extends in a lateral direction and, as illustrated in FIG. 1, tapers in height in a rearward direction. The illustrated protrusion 100 extends upward relative to the balance of the roof member 62 and generally is defined within a portion of the roof member 62 that is inward of the perimeter 67 of the roof member 62.

A mounting pad 102 is defined on a forward portion of the protrusion 100. The mounting pad 102 provides a mounting location for at least one of antennae (not shown), an RF antennae (transmitter) or the like. As such, the mounting pad 102 generally comprises a flat surface. Preferably, the mounting pad 102 is disposed at a forward portion of the roof member 62. More preferably, the mounting pad 102 is located in a central location and in a forward portion of the protrusion 100. This location advantageously positions the pad 102 proximate electronics that will be mounted below the roof member 62 in manners that will be described.

Preferably, a slightly upset lip 103 is defined about the forward periphery of the mounting pad 102. The lip 103 extends slightly above the flat surface of the mounting pad and provides protection to the mounting portion of the antennae, RF antennae (transmitter) or the like such that branches and other obstructions can be deflected away from the lower portion of a mounted antennae to reduce the likelihood that the mounted components will be stripped from the roof member 62. The lip 103 preferably tapers in height in a rearward direction. In one arrangement, the lip 103 tapers such that it merges in height with the mounting pad 102 adjacent a rear portion of the mounting pad 102.

With reference now to FIG. 2, a pair of accessory mounting pads 104 are located in the underside of the roof member 62. In a presently preferred construction, the accessory mounting pads 104 are disposed within the protrusion 100 such that the accessory mounting pads 104 are vertically higher than the balance of the underside of the roof member 62. Because the accessory mounting pads 104 provide a mounting location for accessories, including but not limited to, electronics, such as, for example but without limitation, a GPS receiver and display system, a CB radio or other form of radio, mounting the accessories within the protrusion allows the accessories to be mounted higher to reduce the impact of the accessories on sight lines of an operator of the vehicle and on headroom within the vehicle.

Preferably, the accessory mounting pads 104 are disposed to each side of the antennae mounting pad 102 such that connections, if needed or desired, to an antennae or transmitter can be shortened. In one preferred arrangement, the centers of the accessory mounting pads 104 are aligned with the longitudinal center of the pad 102. In the illustrated arrangement, the accessory mounting pads 104 each comprise a square box-like construction with a pair of crossing wall extending from corner to corner in an x-pattern. Any other suitable construction can be used. For instance, a solid square pad, a cylindrical pad, a rectangular pad or the like can be used instead.

With reference now to FIGS. 5–9, the roof member 62 preferably comprises an improved rain drainage system. The drainage system, in one presently preferred arrangement, removes virtually all standing water locations through strategic placement of drains and strategic development of contours.

Generally speaking, the illustrated roof member 62 comprises a U-shaped gutter 110 that extends along at least a portion of the lateral sides and along the rear portion of the roof member 62. See FIG. 5. The gutter 110 is positioned along three of the four sides that define the periphery 67 of the illustrated roof member 62. Thus, in one arrangement, the gutter 110 comprises a first longitudinal portion 112, a second longitudinal portion 114 and a transverse portion 116. The two longitudinal portions 112, 114 extend generally in parallel with each other. The transverse portion 116 extends to and, in the illustrated arrangement, beyond the longitudinal portions 112, 114 such that the transverse portion 116 opens at the lateral sides of the roof member 62 in a pair of outlets 118. In some arrangements, a forward transverse gutter also can be provided.

The pair of outlets 118 for the gutter 110 advantageously are provided through the longitudinally extending lateral side surfaces of the top rather than through the rear wall or through the corner of the top. Extending the outlets 118 to the lateral sides of the car reduces the likelihood that runoff will fall on golf clubs that are disposed below a central portion of the roof member 62. In addition, while seeming to be a small change from prior arrangements, this construction greatly improves the aesthetics of the roof member 62 by providing an uninterrupted rear panel 119, as is evident in FIGS. 9 and 13. This uninterrupted rear panel 119, which can contain manufacturing identification in some arrangements, visually creates an uninterrupted line which is more pleasing aesthetically than prior arrangements. The rear panel 119 can have an enlarged portion 121 for receiving the identification information and the enlarged portion 121 can extend downward to a degree that does not significantly interfere with stacking of tops, which will be described in detail below, if a stacking arrangement is employed.

Figure 6:
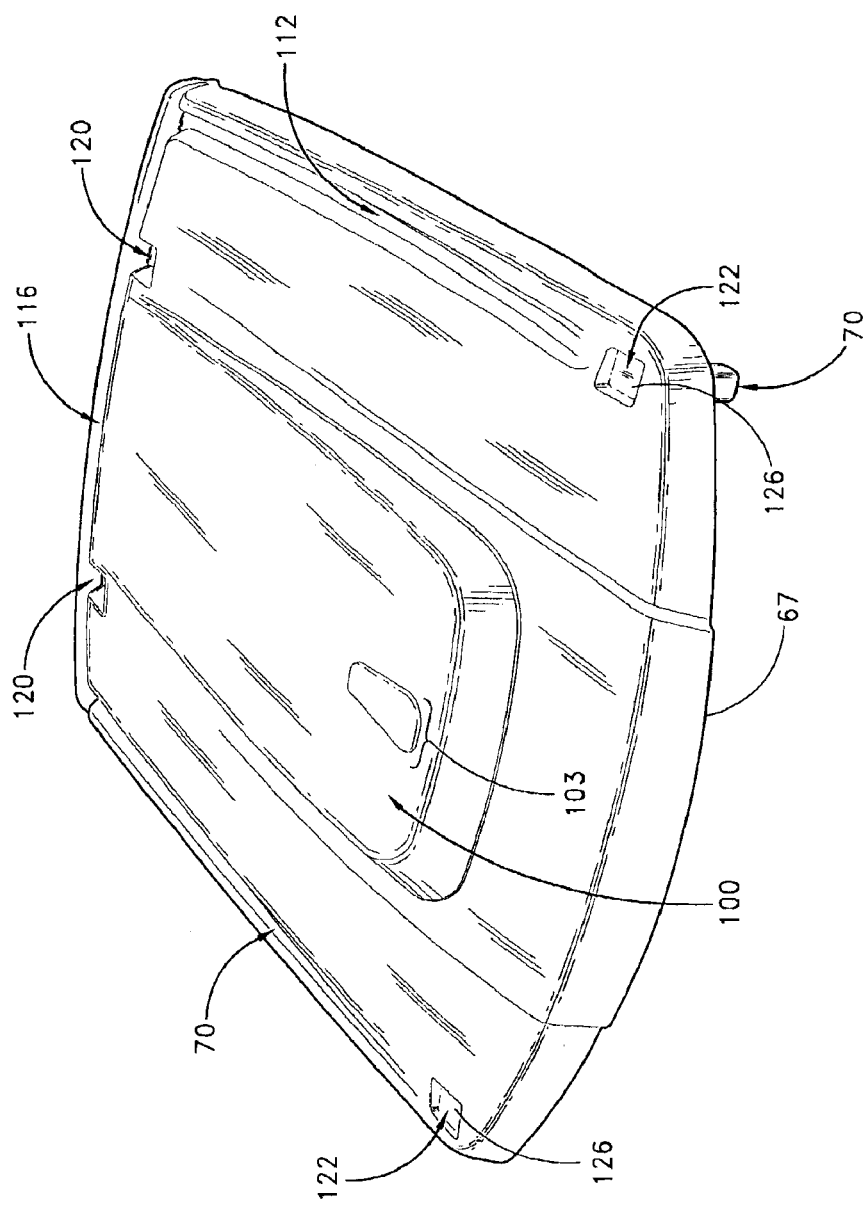
FIG. 6 is a perspective view of the roof member viewed from the front left side.

With reference to FIG. 6, the longitudinal portions 112, 114 of the gutter 110 slope downward in a rearward direction. Preferably, relative to a true horizontal plane, the longitudinal portions slope downward between about 0.5° and about 10°. More preferably, the slope of these portions is between about 1° and about 2°. In one presently preferred arrangement, the angle of slope is about 1.4°. In this arrangement, the slope is sufficient to effect water removal in a rearward direction when the golf car 30 is parked on a moderate incline with the front of the golf car 30 pointing downhill.

The transverse portion 116 of the gutter 110, due to crowning of the roof member 62, slopes downward in an outward direction. Again, this angle preferably is sufficient to allow drainage when the associated vehicle is parked on an incline. In one arrangement, the slope is provided by a curved surface (e.g., an arc).

The transverse portion 118 also is connected to a pair of rear stacking pads 120. The rear stacking pads 120 are formed for reasons that will be discussed later. The rear stacking pads 120, however, are desirably sloped slightly downward in a rearward direction to minimize the amount of standing water than can accumulate in the pockets defined around the recess rear stacking pads 120. In some arrangements, each of the rear stacking pads 120 can be provided with an independent drain; however, such a construction is less desirable as water could drain into the golf club storage location unless such drains were properly positioned and constructed.

A pair of front stacking pads 122 also are provided. The front stacking pads 122 are separated from the longitudinal portions 112, 114 of the gutter 110 in the illustrated arrangement. In some configurations, the front stacking pads 122 can be integrated into the gutter 110. In the illustrated arrangement, however, drain holes 124 are provided in the recesses defining the front stacking pads 122.

Figure 8:
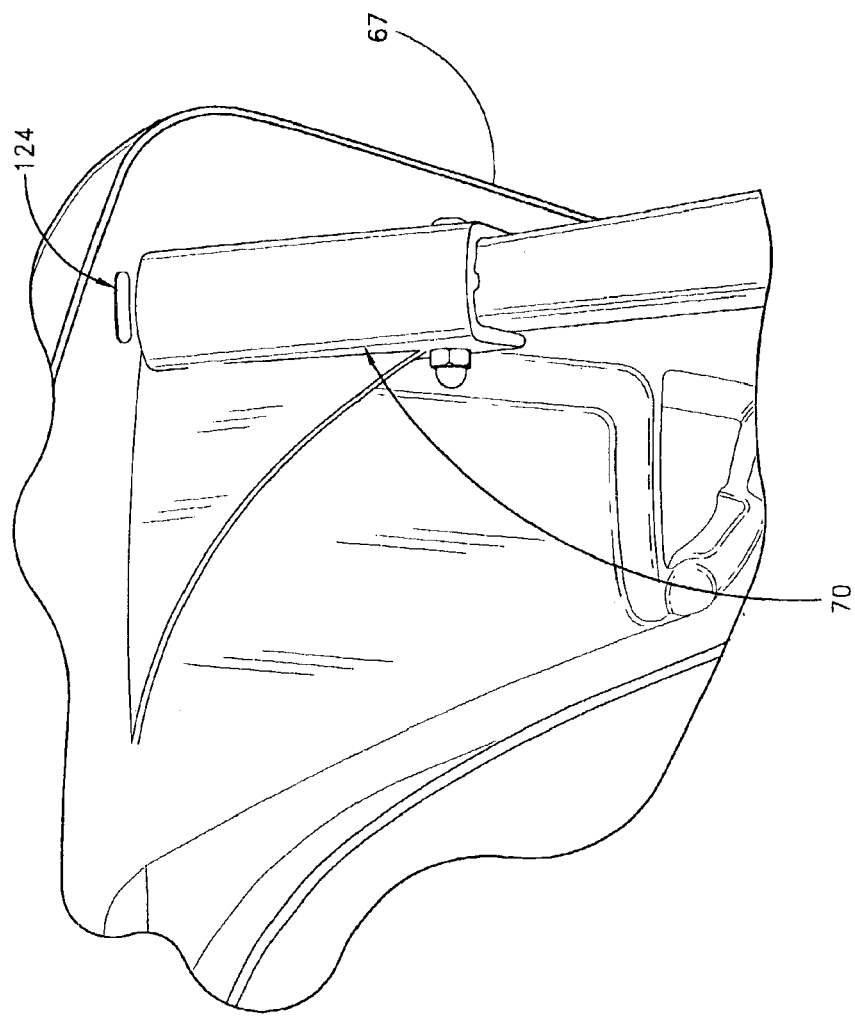
FIG. 8 is a perspective view of the roof member and a front left strut illustrating the drainage hole of FIG. 7.
Figure 9:
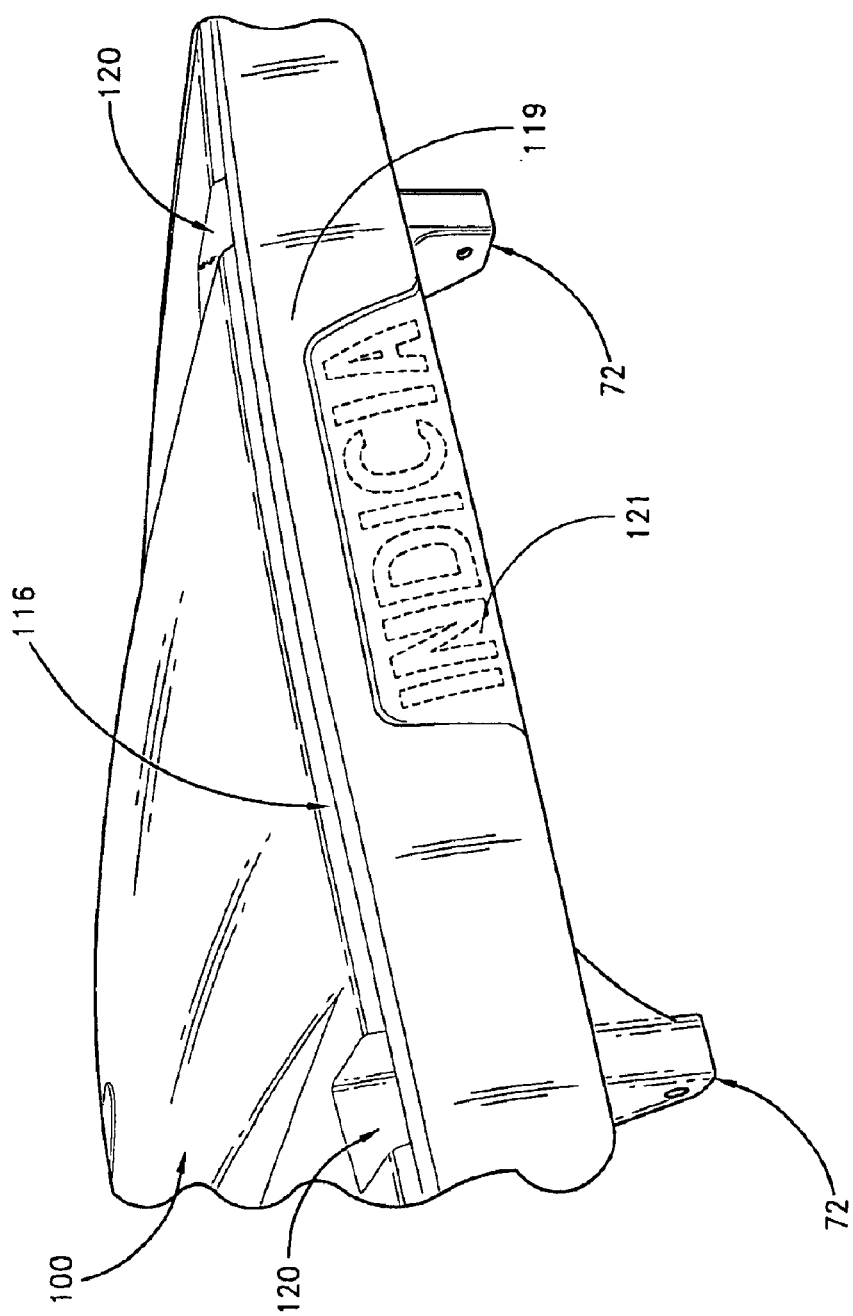
FIG. 9 is a perspective view of the roof member viewed from the left rear illustrating a portion of a drainage system and the rear feet of the top.

Each of the drain holes 124, as illustrated in FIG. 8, opens along a portion of the respective front feet 70. In a more preferred arrangement, the drain holes 124 open along a forward face of the front feet 70 such that the front feet 70 are positioned between the drain holes 124 and the occupants of the golf car. In this manner, water draining through the drain holes 124 is piped down the front feet 70 and the front struts 64 through hydrophilic forces. This reduces splashing on the occupants of the golf car 30. Preferably, to enhance these properties, the drain holes 124 are elongated in a lateral direction. More preferably, the drain holes 124 have a straight edge that is defined along the lateral dimension of the foot 70 and that is disposed adjacent the foot 70. In one particularly preferred arrangement, the drain holes 124 are rectangular in construction.

Figure 7:
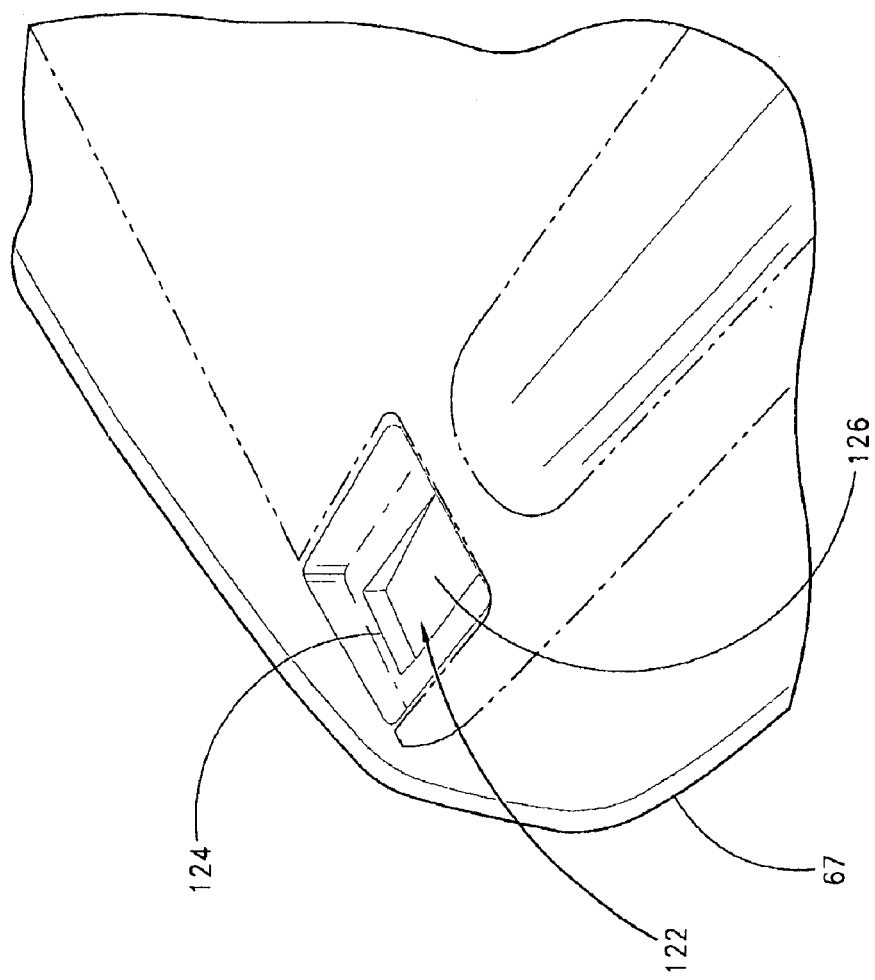
FIG. 7 is an enlarged perspective view of a front left corner of the roof member illustrating a front pad and drainage hole.

With continued reference to FIG. 7, the bottom walls 126 of the front stacking pads 122 slope gently forward to reduce the likelihood of standing water accumulating within the recesses that define the front stacking pads 122. Preferably, relative to a true horizontal, the bottom walls 126 slope downward between about 1° and about 45°. More preferably, the slope of these portions is between about 50 and about 20°. In one presently preferred arrangement, the angle of slope is about 7.3°. In this arrangement, the slope is sufficient to effect water removal in a forward direction when the associated vehicle is parked on a moderate incline with the front of the vehicle pointing downhill. In addition, in this arrangement, the sloping has minimal effect on stacking, which will be described below.

Figure 11:
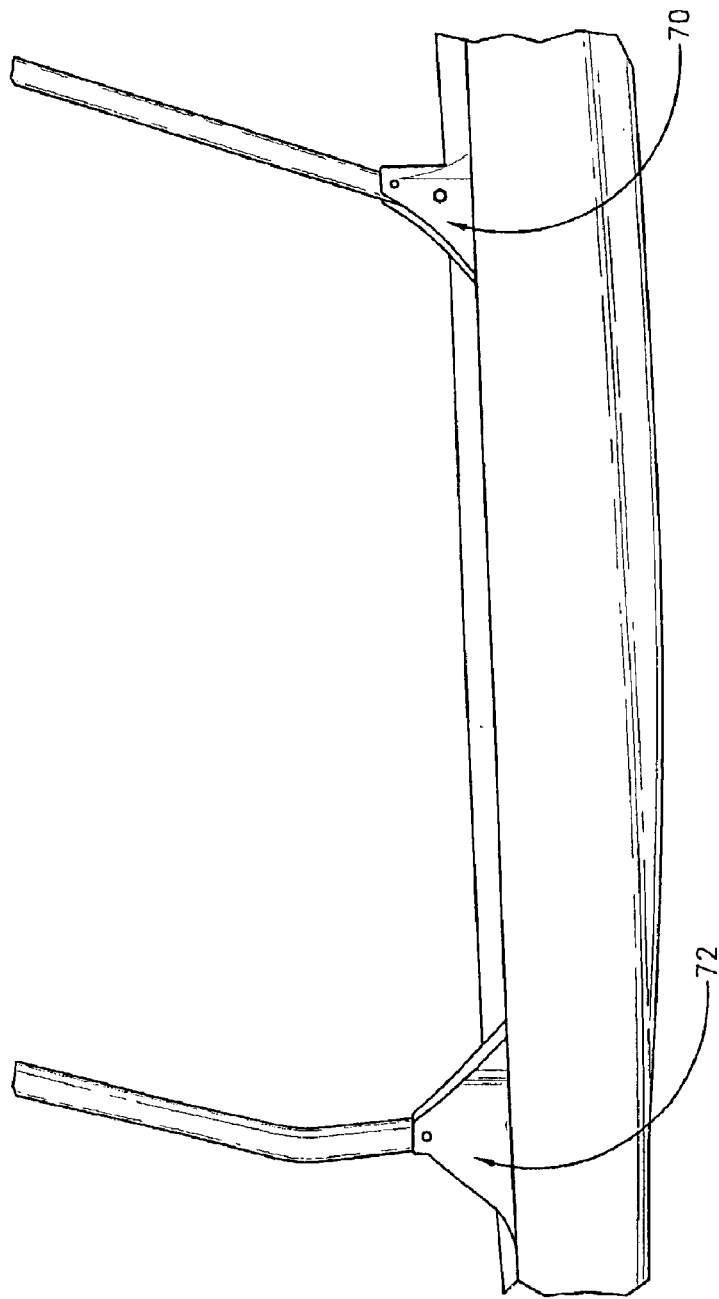
FIG. 11 is a side view of the roof member illustrating that the handles preferably are concealed when viewed from the side.

With reference now to FIG. 2, two handles 130 are mounted to the lower surface 68 of the illustrated roof member 62. The handles 130 preferably are integrally formed with the roof member 62 in one arrangement. Such an integrated construction reduces manufacturing costs. Nonetheless, in some arrangements, the handles 130 may be separately formed and attached to the roof member 62 in any suitable manner. For instance, in one arrangement, the handles 130 can be affixed to the roof member 62 with threaded fasteners that extend into bosses formed on the lower surface 68 of the roof member 62. Regardless of the attachment method, the handles 130 desirably are sized and positioned such that the roof member 62 substantially conceals them. In other words, as illustrated in FIG. 11, the handles 130 preferably are not viewable when the roof member is viewed from a lateral side. In some arrangements, about ⅛ of the total vertical extent of the handles 130 can project downward below a lowermost edge at the periphery 67 of the roof member 62. This concealment, however, is not a necessary construction element.

Figure 12:
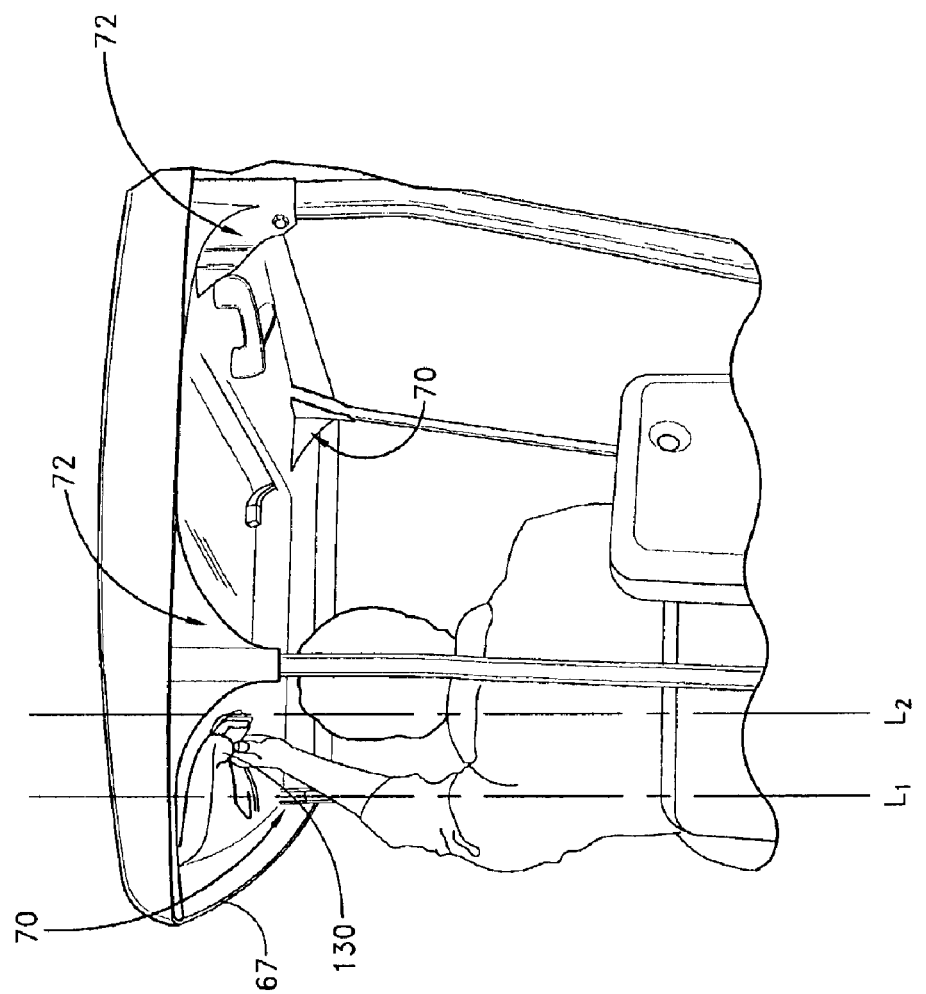
FIG. 12 is a rear view of the golf car with a 90 percentile male grasping the handle with an outboard hand.

With reference now to FIG. 12, the lateral placement of the handles 130 will be described. Preferably, the handles 130 are positioned inboard of the outer peripheral edge 67 of the roof member 62. Such a location typically will result in the hands of an occupant that grasps the handle 130 being positioned entirely inside of the outer perimeter 67 of the roof member 62. As illustrated, the handles 130 preferably are mounted inboard of a generally vertical longitudinal plane $L_1$ that extends through the front feet 70 (e.g., the mounting location of the front struts 64 to the roof member 62) of the roof member 62. More preferably, the handles 130 are disposed at a location inboard of an outboard shoulder joint of a 90% male when the male is properly seated in an operating/riding position on the golf car, which is generally aligned with the plane $L_1$ in the illustrated arrangement. Even more preferably, the handle 130 is disposed between this plane and a plane extending between a juncture of the neck and shoulder lines of the 90% male when properly seated. In one arrangement, however, the handles 130 are disposed inboard of a generally vertical longitudinal plane that bisects the 90% male when properly seated. These locations all help to foster proper arm positions that result in substantially the entirety of the occupant's outboard arm being positioned within a vertical volume that is generally defined by the perimeter 67.

Figure 13:
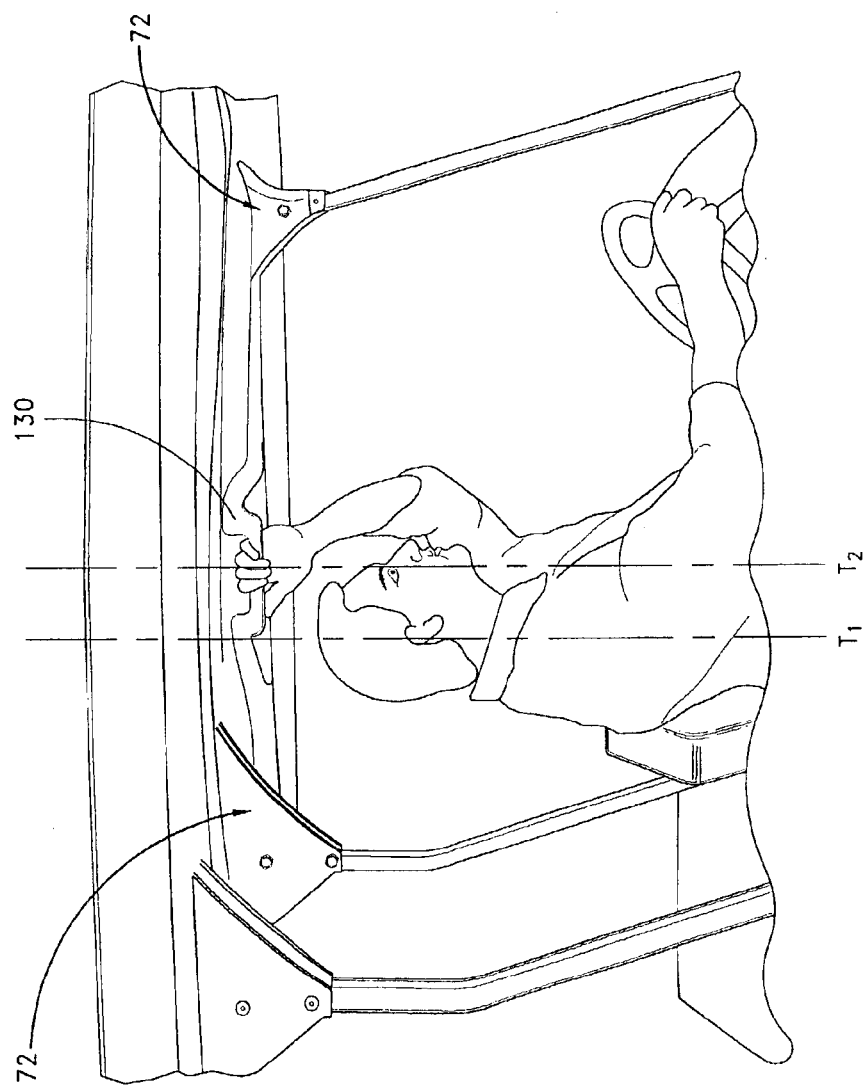
FIG. 13 is a side view of the golf car with the male of FIG. 12 grasping the handle with the outboard hand.

With reference now to FIG. 13, the longitudinal placement of the handles 130 will be described. In one arrangement, the handles 130 are positioned slightly forward of a generally vertical transverse plane $T_1$ that extends through the shoulder joint of the operator in a fore-and-aft direction. More preferably, a center of the gripping portion of handles 130 is positioned along a generally vertical plane $T_1$ that extends through a chest of the operator. The handles 130 can be positioned further forward in some applications. These locations also help to foster proper arm positions that result in the occupant's outboard arm being positioned within the confines of the roof member 62.

Figure 10:
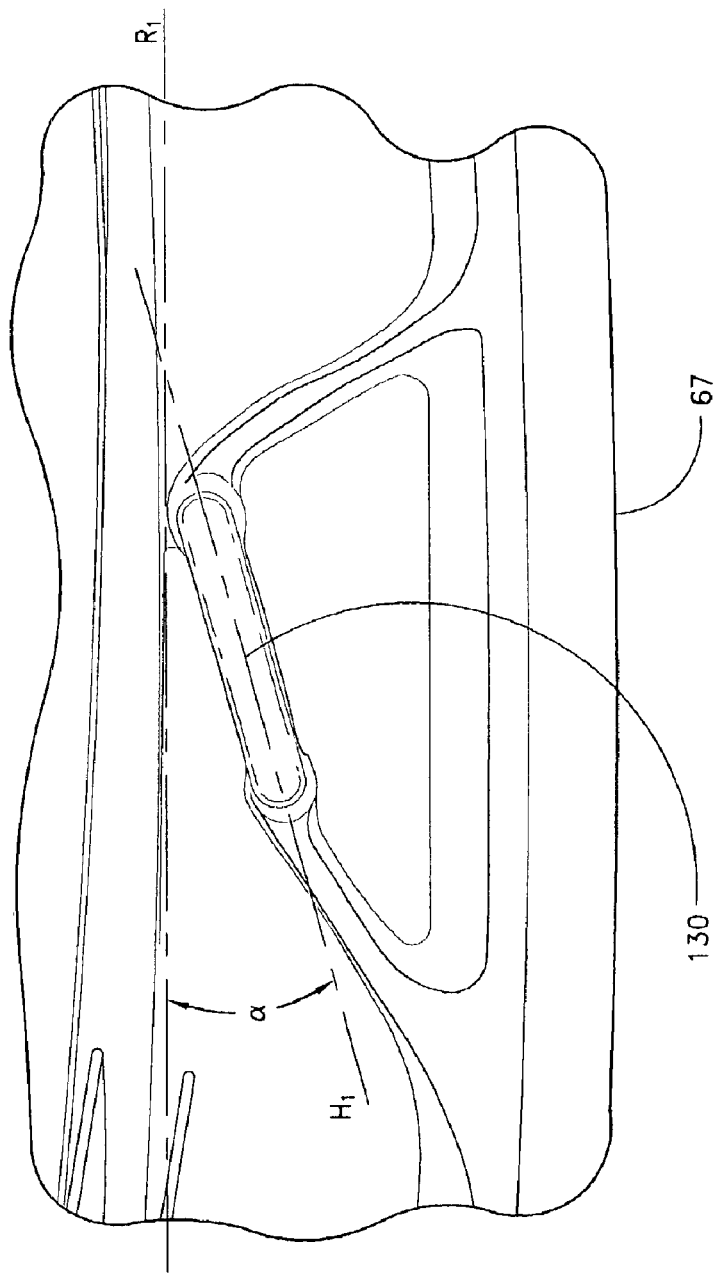
FIG. 10 is an enlarged bottom view of a portion of the top illustrating a preferred placement and orientation of a left handle.

With reference to FIG. 10, the handles 130 preferably are angled relative to a generally vertical longitudinal plane $R_1$. In the illustrated arrangement, an angle a is defined between the plane $R_1$ and a generally vertical plane that extends along the length of the handle $H_1$. This angle $\alpha$ can vary between about zero and 45 degrees. In some arrangements, the angle $\alpha$ is between about 15 and 35 degrees. In one particularly preferred arrangement, the angle $\alpha$ is about 23 degrees. This angle causes gripping of the handle during entry or exit of the vehicle to be difficult and uncomfortable, thus reducing the likelihood of such handle use. Additionally, this angle also helps foster proper arm positions that result in the occupant's outboard arm being positioned within the confines of the roof member 62.

With reference now to FIGS. 14–18, one arrangement of the top generally comprises the roof member 62, the front struts 64 and the rear struts 66 with the struts 64, 66 being pivotally connected to the roof member 62, as by the front feet 70 and the rear feet 72 in the illustrated arrangement. The pivotal connection facilitates folding of the struts into a collapsed position (see FIG. 17) that can be used for shipping and storage and extension of the struts into an installation position (see FIG. 14).

Figure 14:
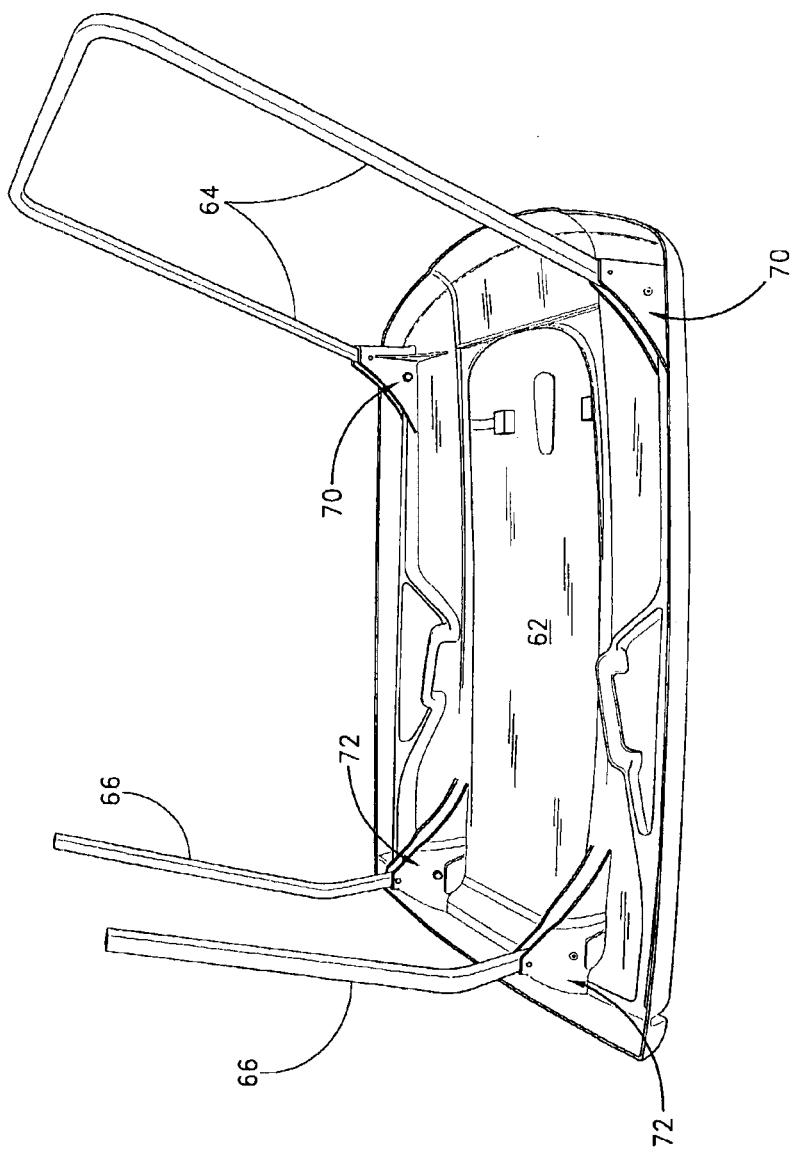
FIG. 14 is a perspective view of the top with the struts fully extended.

With reference now to FIG. 14, the struts 64, 66 are shown extended into the installation position. In this position, the struts 64, 66 can be secured against folding into the collapsed position in any suitable manner. As discussed above, the illustrated arrangement uses a first threaded fastener to define the pivot location and a second threaded fastener to secure the struts in the extended installation position.

When folding the struts, the front U-shaped strut 64 preferably is collapsed first (see FIG. 15). The front strut 64 can rest on structures defined on the lower surface 68 of the roof member 62 when completely folded. In the illustrated arrangement, the front struts 64 rest on the bottom surfaces of the longitudinal portions 112, 114 of the gutter 110. In another arrangement, ribs can be defined on the lower surface 68 to support the front struts 64 when properly folded.

After the front strut has been folded, the rear struts 66 can be folded over the bight of the U-shaped member defining the illustrated front struts 64. Thus, the rear struts 66 secure the front struts 64 in the collapsed position in the illustrated arrangement. In other arrangements, the front struts 64 can secure the rear struts 66 in the collapsed position.

Figure 17:
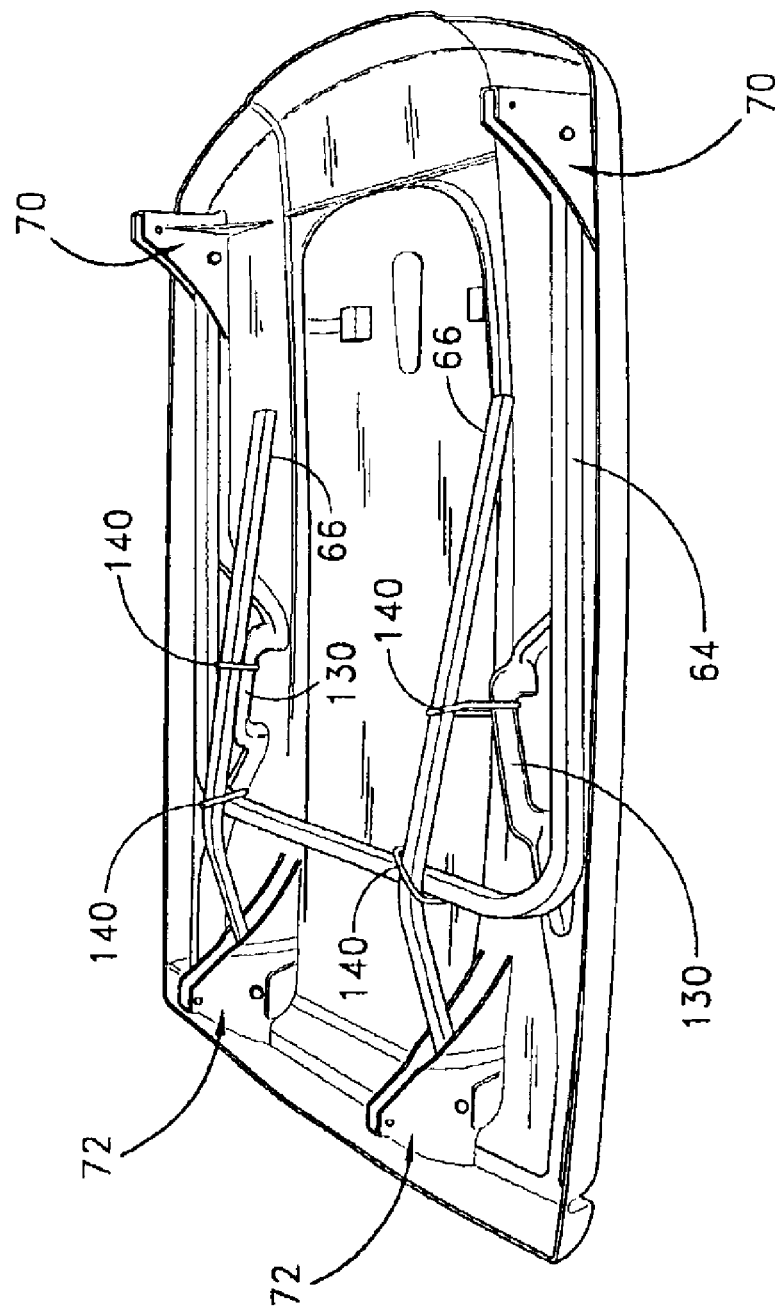
FIG. 17 is a perspective view of the top with the struts folded and secured for shipping.
Figure 19:
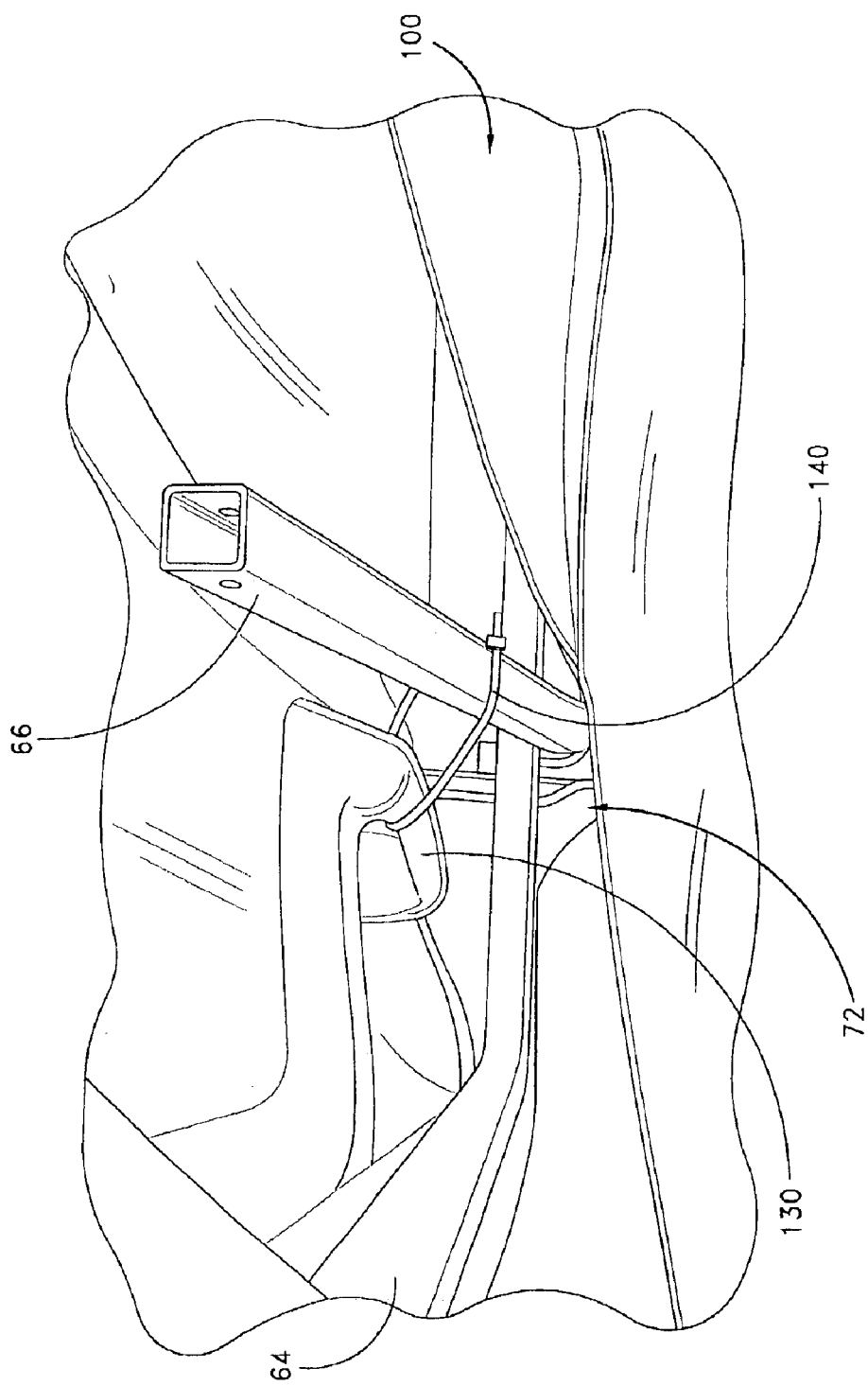
FIG. 19 is a view between two stacked tops illustrating that the folded struts preferably do not contact the upper surface of the roof member beneath the struts when properly stacked.

The rear struts 66 are secured in position using any suitable technique. In the illustrated arrangement, tie-wraps 140 extend around the handles 130 and the respective strut 66. Preferably, when secured in position, only a distal end of each rear strut 66 contacts the lower surface 68 of the roof member 62. To reduce the likelihood of marring the roof member 62, a sock of foam or other suitable material (not shown) can be positioned over the distal end of the rear strut 66. As illustrated in FIG. 17, the rear struts 66 and the front struts 64 can be secured together using tie-wraps 140. Such a connection provides additional insurance against undesired extension of the struts 64, 66 during handling and shipping. In some arrangements, an intervening member or padding (not shown) can be positioned between the struts 64, 66 at the contact location to reduce marring and noise that might be incurred during handling and shipping. Advantageously, when the struts 64, 66 are doubly secured, only the distal end of the rear struts 66 contact the lower surface 68 of the roof member 62 because the front strut 64 is suspended from the rear struts 66 (see FIG. 19).

In one arrangement, mechanical clips (not shown) are used to secure at least the rear struts 66 in position relative to the roof member 62. In another arrangement, the mechanical clips are integrally formed with the roof member 62. The mechanical clips can be configured with three fingers such that the outer fingers grip one side of the strut and the middle finger grips the opposite side of the strut with the middle finger being adapted to be bent out of the way to release the strut. Other mechanical clips also can be used. In addition, additional holes can be formed in the feet 70, 72 or other structures formed on the lower surface 68 of the roof member 62 through which threaded fasteners can extend. It should be noted that a package of additional fasteners can be taped or otherwise secured to one of the struts for shipping. For instance, in one particularly preferred arrangement, the package can be taped to a portion of the bight of the U-shaped member defining the front struts 64.

To unfold the struts 64, 66, the struts 64, 66 are first unfastened and then extended. Generally speaking, the unfolding is performed in the reverse order compared to folding. Once extended, the struts 64, 66 can be secured in the extended position. Once secured in position, the top can be connected to the vehicle.

With reference now to FIGS. 19–22, the illustrated tops 60 have been designed for stacking. In particular, the tops 60 can be stacked together for shipping and storage. In one arrangement, between two and twelve tops 60 can be stacked together. In another arrangement, between three and ten tops 60 can be stacked together. In a presently preferred arrangement, about seven tops 60 are stacked together for shipping. The tops 60 generally do not require strapping when stacked for shipping. In some arrangements, however, stacks of tops 60 can be shrink-wrapped together or otherwise secured for shipping.

Figure 20:
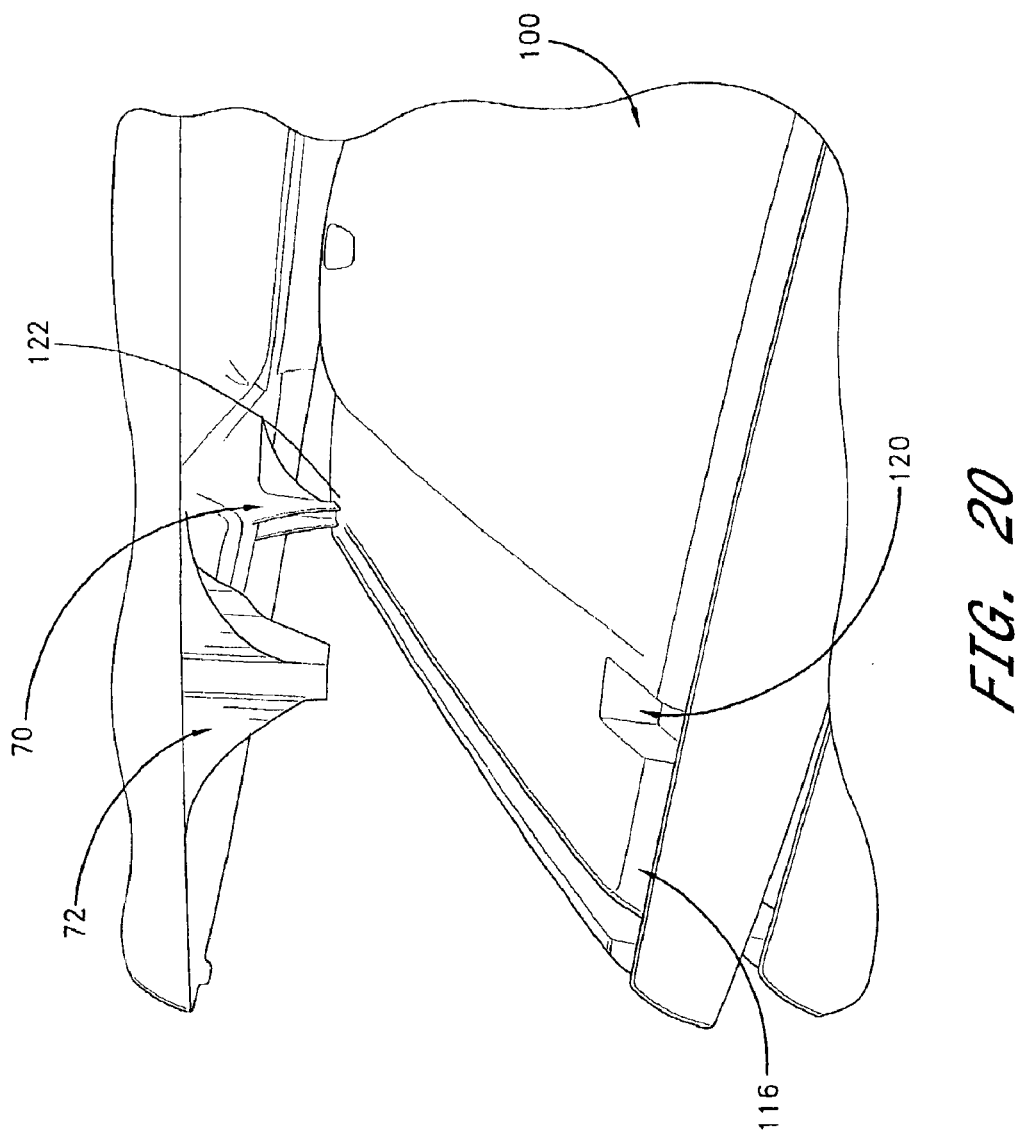
FIG. 20 is a rear view of two tops being stacked together with the front feet of the upper top contacting the front pads of the lower top.
Figure 21:
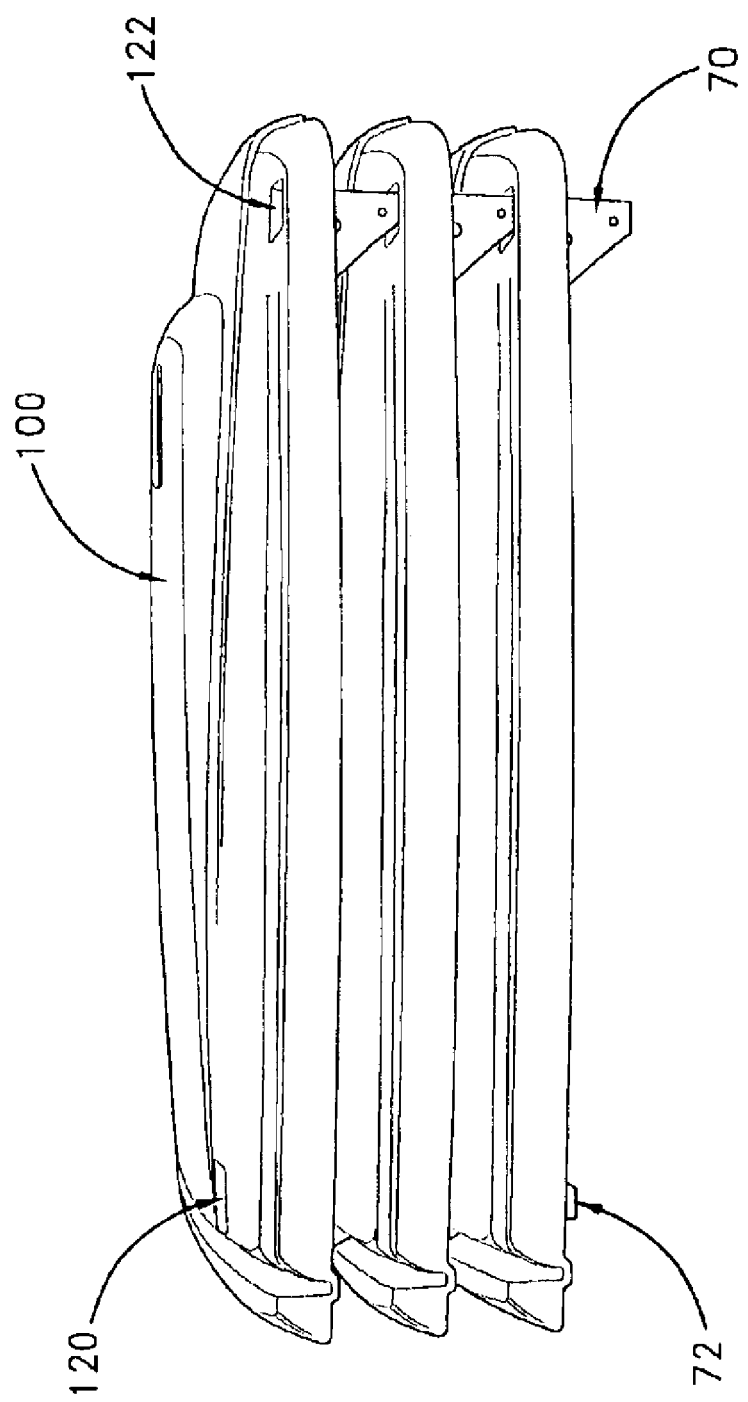
FIG. 21 is a side elevation view of three tops stacked together for shipping.
Figure 22:
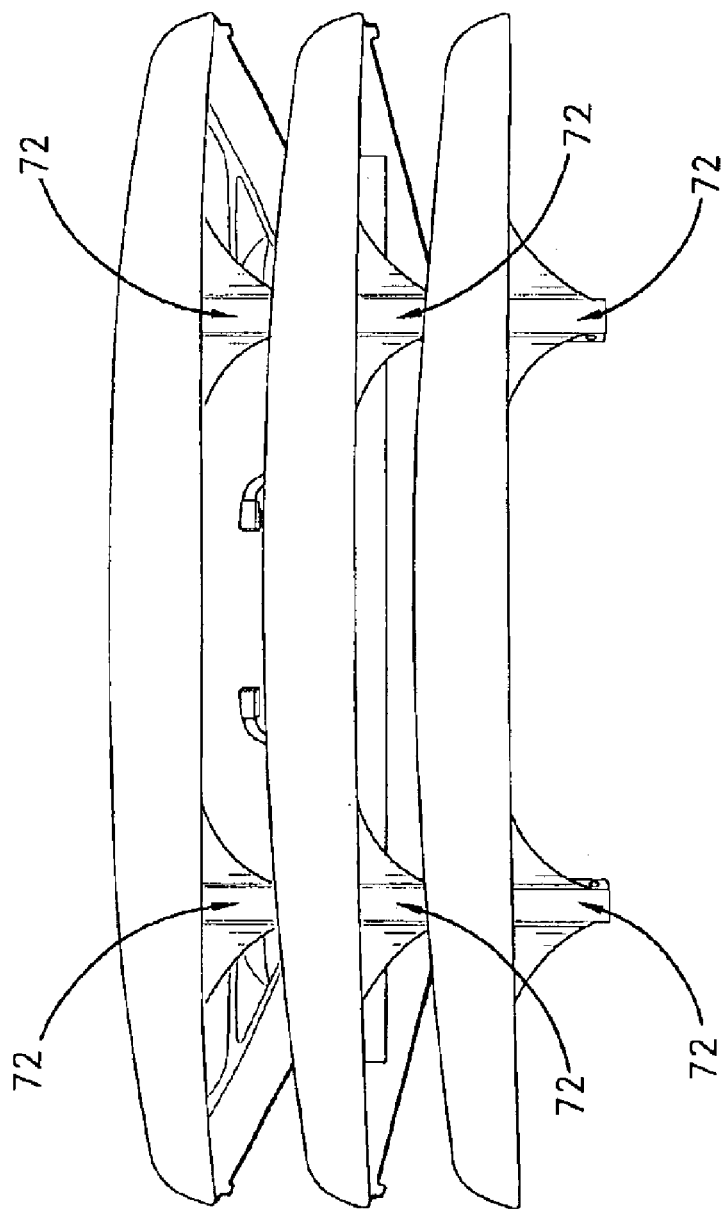
FIG. 22 is a rear elevation view of three tops stacked together for shipping.

When stacked, the feet 70, 72 of the upper top 60 contact the contact pads 120, 122 of the lower top 60 (see FIGS. 20–22). Preferably, due in part to the downward extension of the feet 70, 72 and the securing technique for the folded struts 64, 66, contact between the struts 64, 66 of one top with the top surface of the underlying top 60 is very unlikely (see FIG. 19). Even more preferably, contact between two adjacent tops 60 is limited to solely the contact pads 120, 122 and the feet 70, 72. As such, marring of one top 60 due to contact with another top 60 is extremely unlikely.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A small vehicle comprising a frame assembly, a front wheel and a rear wheel supporting said frame assembly, a top assembly mounted to said frame assembly, said top assembly comprising a roof member, a front strut and a rear strut, said roof member comprising an outer perimeter and a handle, and said handle being connected to said roof member and being disposed inside of said outer perimeter such that an outboard elbow would be completely positioned within said outer perimeter when an outboard hand grasps said handle, wherein said roof member comprises a generally horizontal portion and a downwardly extending circumferential flange, said flange extending downward a first distance, said handle extending downward from said generally horizontal portion a distance less than said first distance such that said handle is recessed into said roof member relative to a plane define by a lower lip of said flange.

2. A small vehicle comprising a frame assembly, a front wheel and a rear wheel supporting said frame assembly, a top assembly mounted to said frame assembly, said top assembly comprising a roof member, a front strut and a rear strut, said roof member comprising an outer perimeter and a handle, and said handle being connected to said roof member and being disposed inside of said outer perimeter such that an outboard elbow would be completely positioned within said outer perimeter when an outboard hand grasps said handle, wherein said handle comprises a substantially cylindrical portion adapted for grasping, said substantially cylindrical portion comprising a longitudinal axis, said longitudinal axis extending at an angle relative to a generally vertical, plane that extends in a longitudinal direction of the roof member.

3. The vehicle of claim 2, wherein said angle is about 23 degrees.

4. The vehicle of claim 2, wherein said handle is integrally formed with said roof member.

5. The vehicle of claim 1, wherein said front strut is pivotally connected to said roof member by a front foot and said rear strut is pivotally connected to said roof member by a rear foot.

6. The vehicle of claim 5, wherein said roof member comprises a generally horizontal portion and a downwardly extending circumferential flange, said flange extending downward a first distance, and said front foot and said rear foot extend downward from said generally horizontal portion a distance greater than said first distance.

7. The vehicle of claim 5, wherein a rear foot supporting wall extends inboard of said rear foot and said supporting wall is adapted to receive an information holder.

8. The vehicle of claim 7, wherein said rear foot supporting wall is adapted to receive two information holders arranged side by side.

9. The vehicle of claim 7, wherein a front information holder wall is disposed at a location inboard of said front foot and said front information holder wall is adapted to receive an information holder such that at least two information holders can be attached to said roof member with said at least two information holders being longitudinally separated.

10. The vehicle of claim 5, wherein said roof member further comprises an upwardly extending protrusion with at least one antennae mounting pad being defined on an upper surface of said protrusion.

11. The vehicle of claim 10, wherein a lip extends upward from a forward portion of said antennae mounting pad.

12. The vehicle of claim 11, wherein said lip wraps rearward around a portion of said antennae mounting pad and tapers in height in a rearward direction.

13. The vehicle of claim 10, wherein two accessory mounting pads are defined along a lower surface of said protrusion.

14. The vehicle of claim 1, wherein said roof member further comprises a rain gutter that extends around only three sides of said roof member.

15. The vehicle of claim 1, wherein a drain hole is positioned adjacent said front strut such that water passing through said drain hole is directed onto an exterior surface of said front strut.

16. The vehicle of claim 15, wherein said front strut is square and said exterior surface is forwardly disposed.

17. The vehicle of claim 15, wherein said vehicle is a golf car.

18. A method of manufacturing and shipping an assembled top for a small vehicle, said method comprising forming a roof member, pivotally attaching supports to said roof member and securing said supports in a lowered position to said roof member and shipping said assembled top separate from the small vehicle.

19. The method of claim 18 further comprising forming a stack of between three and ten assembled tops and shipping said stack of assembled tops.

20. The method of claim 19, wherein said stack is strapped together for shipping.

21. A top assembly for a small vehicle, said top assembly comprising a roof member, a front strut and a rear strut, said roof member comprising downwardly depending feet to which said front strut and said rear strut are pivotally attached, said roof member further comprising an upper surface and contact pads formed on said upper surface at a location that aligns with said downwardly depending feet such that a first roof member can be stacked on a second roof member with said feet positioned on said contact pads, said front strut and said rear strut being pivotally connected to said roof member, said roof member, and said front strut and said rear strut each comprising a securing configuration adapted to secure said front strut and said rear strut in an extended position.

22. The top assembly of claim 21, wherein said securing configuration comprises a set of holes that are aligned when said front strut and said rear strut are extended.

23. The top assembly of claim 22, wherein said securing configuration further comprises a set of threaded fasteners that can extend through said set of holes when aligned.

24. The top assembly of claim 21, wherein roof member comprises a drainage system formed on said upper surface and said contact pads are connected to said drainage system.

25. The top assembly of claim 21, wherein said roof member further comprises an upper surface and an antennae mounting pad is disposed on said upper surface.

26. The top assembly of claim 25, wherein a protective lip at least partially surrounds said antennae mounting pad.

27. The top assembly of claim 25, wherein said roof member further comprises a lower surface, at least one accessory mounting pad being disposed on said lower surface at a location proximate to the location of said antennae mounting pad on said upper surface.

28. A small vehicle comprising a frame assembly, a front wheel and a rear wheel supporting said frame assembly, a top assembly mounted to said frame assembly, said top assembly comprising a roof member, a front strut and a rear strut, said roof member comprising an outer perimeter and a handle, and said handle being connected to said roof member and being disposed inside of said outer perimeter such that a hand grasping said handle would be completely positioned within said outer perimeter, said roof member comprising a generally horizontal portion and a downwardly extending circumferential flange, said flange extending downward a first distance, said handle extending downward from said generally horizontal portion a distance less than said first distance such that said handle is recessed into said roof member relative to a plane define by a lower lip of said flange.

29. A small vehicle comprising a frame assembly, a front wheel and a rear wheel supporting said frame assembly, a top assembly mounted to said frame assembly, said top assembly comprising a roof member, a front strut and a rear strut, said roof member comprising an outer perimeter and a handle, and said handle being connected to said roof member and being disposed inside of said outer perimeter such that a hand grasping said handle would be completely positioned within said outer perimeter, said handle comprising a substantially cylindrical portion adapted for grasping, said substantially cylindrical portion comprising a longitudinal axis, said longitudinal axis extending at an angle relative to a generally vertical plane that extends in a longitudinal direction of the roof member.

30. The vehicle of claim 29, wherein said angle is about 23 degrees.

31. A small vehicle comprising a frame assembly, a front wheel and a rear wheel supporting said frame assembly, a top assembly mounted to said frame assembly, said top assembly comprising a roof member, a front strut and a rear strut, said roof member comprising an outer perimeter and a handle, and said handle being connected to said roof member and being disposed inside of said outer perimeter such that a hand grasping said handle would be completely positioned within said outer perimeter, a rear foot supporting wall extending inboard of a rear foot and said supporting wall being adapted to receive an information holder.

32. The vehicle of claim 31, wherein said rear foot supporting wall is adapted to receive two information holders arranged side by side.

33. The vehicle of claim 31, wherein a front information holder wall is disposed at a location inboard of said front foot and said front information holder wall is adapted to receive an information holder such that at least two information holders can be attached to said roof member with said at least two information holders being longitudinally separated.

34. A small vehicle comprising a frame assembly, a front wheel and a rear wheel supporting said frame assembly, a top assembly mounted to said frame assembly, said top assembly comprising a roof member, a front strut and a rear strut, said roof member comprising an outer perimeter and a handle, and said handle being connected to said roof member and being disposed inside of said outer perimeter such that a hand grasping said handle would be completely positioned within said outer perimeter, said front strut being pivotally connected to said roof member by a front foot and said rear strut being pivotally connected to said roof member by a rear foot, said roof member further comprising an upwardly extending protrusion with at least one antennae mounting pad being defined on an upper surface of said protrusion.

35. The vehicle of claim 34, wherein a lip extends upward from a forward portion of said antennae mounting pad.

36. The vehicle of claim 35, wherein said lip wraps rearward around a portion of said antennae mounting pad and tapers in height in a rearward direction.

37. The vehicle of claim 34, wherein two accessory mounting pads are defined along a lower surface of said protrusion.

38. A small vehicle comprising a frame assembly, a front wheel and a rear wheel supporting said frame assembly, a top assembly mounted to said frame assembly, said top assembly comprising a roof member, a front strut and a rear strut, said roof member comprising an outer perimeter and a handle, and said handle being connected to said roof member and being disposed inside of said outer perimeter such that a hand grasping said handle would be completely positioned within said outer perimeter, said roof member further comprising a rain gutter that extends around only three sides of said roof member.

39. A small vehicle comprising a frame assembly, a front wheel and a rear wheel supporting said frame assembly, a top assembly mounted to said frame assembly, said top assembly comprising a roof member, a front strut and a rear strut, said roof member comprising an outer perimeter and a handle, and said handle being connected to said roof member and being disposed inside of said outer perimeter such that a hand grasping said handle would be completely positioned within said outer perimeter, and a drain hole being positioned adjacent said front strut such that water passing through said drain hole is directed onto an exterior surface of said front strut.

40. The vehicle of claim 39, wherein said front strut is square and said exterior surface is forwardly disposed.

41. The vehicle of claim 39, wherein said vehicle is a golf car.

42. A top assembly for a small vehicle, said top assembly comprising a roof member, a front strut and a rear strut, said roof member further comprising an upper surface and an antennae mounting pad being disposed on said upper surface, said front strut and said rear strut being pivotally connected to said roof member, said roof member, and said front strut and said rear strut each comprising a securing configuration adapted to secure said front strut and said rear strut in an extended position.

43. The top assembly of claim 42, wherein said securing configuration comprises a set of holes that are aligned when said front strut and said rear strut are extended.

44. The top assembly of claim 43, wherein said securing configuration further comprises a set of threaded fasteners that can extend through said set of holes when aligned.

45. The top assembly of claim 42, wherein said roof member comprises downwardly depending feet to which said front strut and said rear strut are pivotally attached.

46. The top assembly of claim 45, wherein said roof member further comprises an upper surface and contact pads formed on said upper surface at a location that aligns with said downwardly depending feet such that a first roof member can be stacked on a second roof member with said feet positioned on said contact pads.

47. The top assembly of claim 46, wherein roof member comprises a drainage system formed on said upper surface and said contact pads are connected to said drainage system.

48. The top assembly of claim 42, wherein a protective lip at least partially sw-rounds said antennae mounting pad.

49. The top assembly of claim 42, wherein said roof member further comprises a lower surface, at least one accessory mounting pad being disposed on said lower surface at a location proximate to the location of said antennae mounting pad on said upper surface.

50. A small vehicle comprising a frame assembly, a front wheel and a rear wheel supporting said frame assembly, a top assembly mounted to said frame assembly, said top assembly comprising a roof member, said roof member comprising a generally horizontal portion and a downwardly extending circumferential flange, said flange extending downward a first distance from said horizontal portion, a front strut and a rear strut being connected to said roof member, said roof member comprising an outer perimeter and a handle, and said handle being connected to said roof member and being disposed inside of said vertical plane, said handle having a vertical dimension and about ⅛ of said vertical dimension extending downward more than said first distance from said horizontal portion.

51. A small vehicle comprising a frame assembly, a front wheel and a rear wheel supporting said frame assembly, a top assembly mounted to said frame assembly, said top assembly comprising a roof member, said roof member comprising a front foot and a rear foot, a front strut and a rear strut being connected to said front foot and said rear foot respectively, a generally vertical plane extending in a longitudinal direction of said roof and intersecting said front foot, said roof member comprising an outer perimeter and a handle, and said handle being connected to said roof member and being disposed inside of said vertical plane.

52. The vehicle of claim 3, wherein said handle is integrally formed with said roof member.

53. The vehicle of claim 3, wherein said front strut is pivotally connected to said roof member by a front foot and said rear strut is pivotally connected to said roof member by a rear foot.

54. The vehicle of claim 53, wherein said roof member comprises a generally horizontal portion and a downwardly extending circumferential flange, said flange extending downward a first distance, and said front foot and said rear foot extend downward from said generally horizontal portion a distance greater than said first distance.

55. The vehicle of claim 53, wherein a rear foot supporting wall extends inboard of said rear foot and said supporting wall is adapted to receive an information holder.

56. The vehicle of claim 55, wherein said rear foot supporting wall is adapted to receive two information holders arranged side by side.

57. The vehicle of claim 55, wherein a front information holder wall is disposed at a location inboard of said front foot and said front information holder wall is adapted to receive an information holder such that at least two information holders can be attached to said roof member with said at least two information holders being longitudinally separated.

58. The vehicle of claim 53, wherein said roof member further comprises an upwardly extending protrusion with at least one antennae mounting pad being defined on an upper surface of said protrusion.

59. The vehicle of claim 58, wherein a lip extends upward from a forward portion of said antennae mounting pad.

60. The vehicle of claim 59, wherein said lip wraps rearward around a portion of said antennae mounting pad and tapers in height in a rearward direction.

61. The vehicle of claim 58, wherein two accessory mounting pads are defined along a lower surface of said protrusion.

62. The vehicle of claim 3, wherein said roof member further comprises a rain gutter that extends around only three sides of said roof member.

63. The vehicle of claim 3, wherein a drain hole is positioned adjacent said front strut such that water passing through said drain hole is directed onto an exterior surface of said front strut.

64. The vehicle of claim 63, wherein said front strut is square and said exterior surface is forwardly disposed.

65. The vehicle of claim 63, wherein said vehicle is a golf car.

* * * * *

UNITED STATES PATENT AND TRADEMARK OFFICE
CERTIFICATE OF CORRECTION

PATENT NO. : 6,883,846 B2
APPLICATION NO. : 10/386383
DATED : April 26, 2005
INVENTOR(S) : Joel A. Cheek et al.

It is certified that error appears in the above-identified patent and that said Letters Patent is hereby corrected as shown below:

Title Page Item (73) (Assignee), Line 1, delete "YamahaMotor" and insert --Yamaha Motor--.

At Column 1, Line 6 (approx.), after "the" insert --entirety of--.

At Column 2, Line 14, after "lines", delete ".".

At Column 2, Line 16, after "vehicle" insert --of the--.

At Column 3, Line 28, before "supporting", insert --portion of the--.

At Column 9, Line 62, delete "50" and insert --5°--.

At Column 10, Line 62, delete "a" and insert --α--.

At Column 13, Line 11 (approx.), delete "vertical," and insert --vertical--.

At Column 13, Line 14 (approx.), delete "claim 2," and insert --claim 1,--.

At Column 16, Line 35, delete "sw-rounds", and insert --surrounds--.

At Column 16, Line 66, delete "claim 3," and insert --claim 2,--.

At Column 17, Line 1, delete "claim 3," and insert --claim 2,--.

At Column 18, Line 12 (approx.), delete "claim 3," and insert --claim 2,--.

At Column 18, Line 16 (approx.), delete "claim 3," and insert --claim 2,--.

Signed and Sealed this

Fifteenth Day of August, 2006

JON W. DUDAS
*Director of the United States Patent and Trademark Office*